United States Patent
Ishikawa et al.

(10) Patent No.: US 10,339,747 B2
(45) Date of Patent: Jul. 2, 2019

(54) CARD READER

(71) Applicant: NIDEC SANKYO CORPORATION, Suwa-gun, Nagano (JP)

(72) Inventors: Kazutoshi Ishikawa, Nagano (JP); Katsuhisa Higashi, Nagano (JP); Yosuke Oguchi, Nagano (JP); Toshiro Shiomi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/570,757

(22) PCT Filed: Sep. 26, 2016

(86) PCT No.: PCT/JP2016/078148
§ 371 (c)(1),
(2) Date: Oct. 31, 2017

(87) PCT Pub. No.: WO2017/051917
PCT Pub. Date: Mar. 30, 2017

(65) Prior Publication Data
US 2018/0261035 A1 Sep. 13, 2018

Related U.S. Application Data

(60) Provisional application No. 62/232,735, filed on Sep. 25, 2015, provisional application No. 62/247,382, filed on Oct. 28, 2015.

(51) Int. Cl.
*G06K 7/00* (2006.01)
*G07F 7/08* (2006.01)
(Continued)

(52) U.S. Cl.
CPC ............. *G07F 7/0886* (2013.01); *G06K 7/00* (2013.01); *G06Q 20/204* (2013.01);
(Continued)

(58) Field of Classification Search
CPC ..... G07F 7/0886; G06K 7/0013; G06K 7/082
(Continued)

(56) References Cited

U.S. PATENT DOCUMENTS

| 8,127,999 B2 | 3/2012 | Diamond |
| 9,063,737 B2 | 6/2015 | Babu et al. |
| 2007/0152058 A1* | 7/2007 | Yeakley .............. G06F 17/2247 235/462.01 |

FOREIGN PATENT DOCUMENTS

| JP | 2003110579 A | 4/2003 |
| JP | 2009265721 A | 11/2009 |

(Continued)

OTHER PUBLICATIONS

International Search Report for corresponding Application No. PCT/JP2016/078148; dated Dec. 13, 2016.

*Primary Examiner* — Karl D Frech
(74) *Attorney, Agent, or Firm* — Cantor Colburn LLP

(57) ABSTRACT

A card reader may include a wireless user interface; a host connecting interface structured to connect with the host device of the system; and a wireless communication interface structured to connect with the mobile terminal. The wireless user interface may be structured to communicate with the host device through the host connecting interface and with the mobile terminal through the wireless communication interface.

16 Claims, 13 Drawing Sheets

(51) Int. Cl.
    *H04B 1/59*      (2006.01)
    *H04W 84/10*     (2009.01)
    *H04W 76/30*     (2018.01)
    *H04W 76/10*     (2018.01)
    *G06Q 20/20*     (2012.01)
    *G06Q 20/32*     (2012.01)
    *G06K 7/08*      (2006.01)

(52) U.S. Cl.
    CPC ....... *G06Q 20/3278* (2013.01); *G07F 7/0893* (2013.01); *H04B 1/59* (2013.01); *H04W 76/10* (2018.02); *H04W 76/30* (2018.02); *H04W 84/10* (2013.01); *G06K 7/0013* (2013.01); *G06K 7/082* (2013.01)

(58) Field of Classification Search
    USPC ........................................................ 235/436
    See application file for complete search history.

(56)              References Cited

FOREIGN PATENT DOCUMENTS

| | | |
|---|---|---|
| JP | 2014006718 A | 1/2014 |
| JP | 2014192773 A | 10/2014 |
| JP | 2015049525 A | 3/2015 |
| JP | 2015130545 A | 7/2015 |
| WO | 2013175674 A1 | 11/2013 |

* cited by examiner

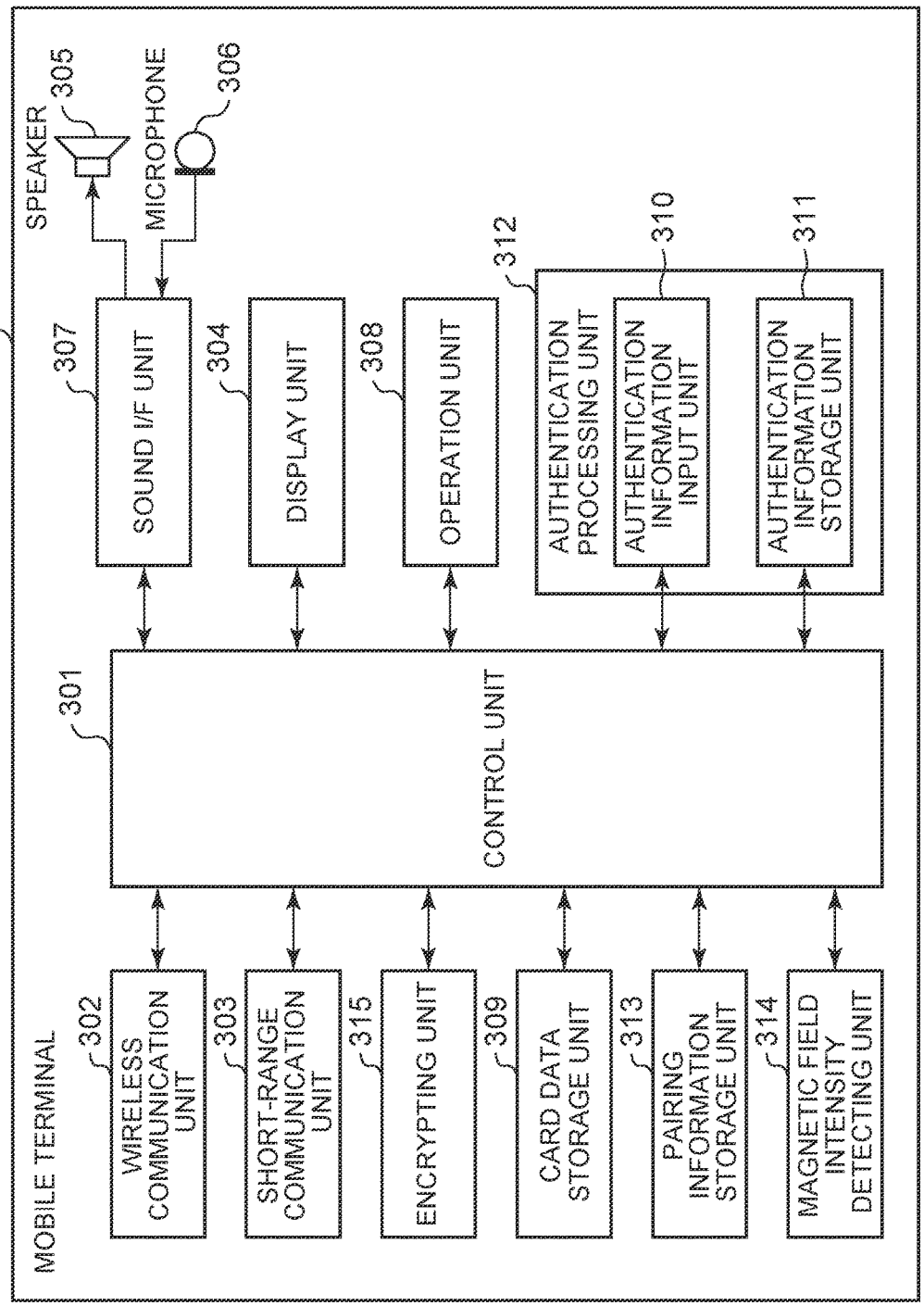

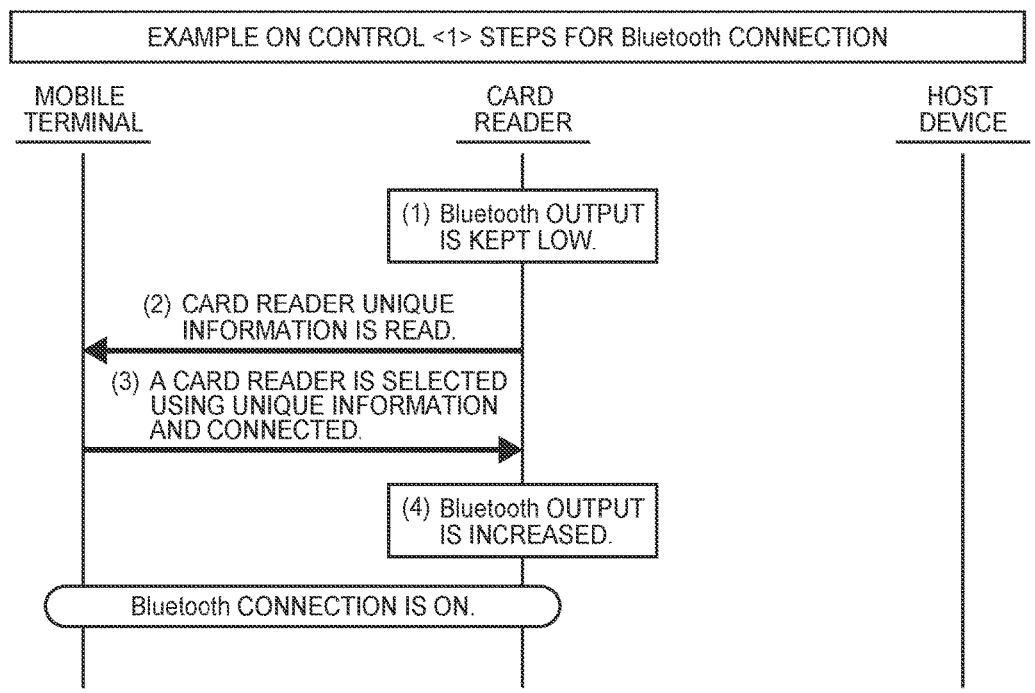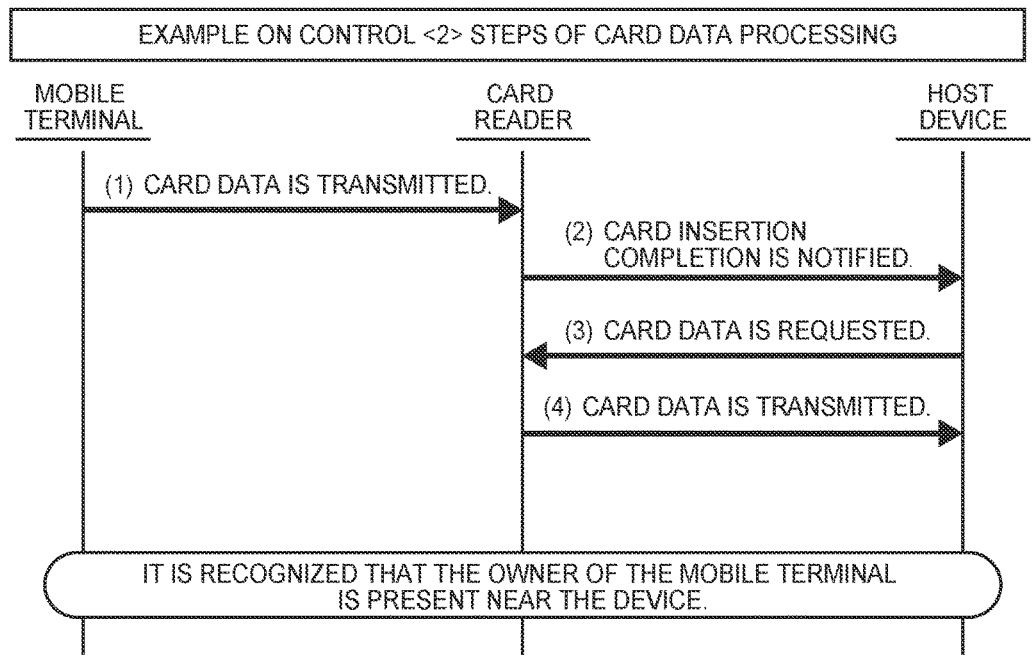

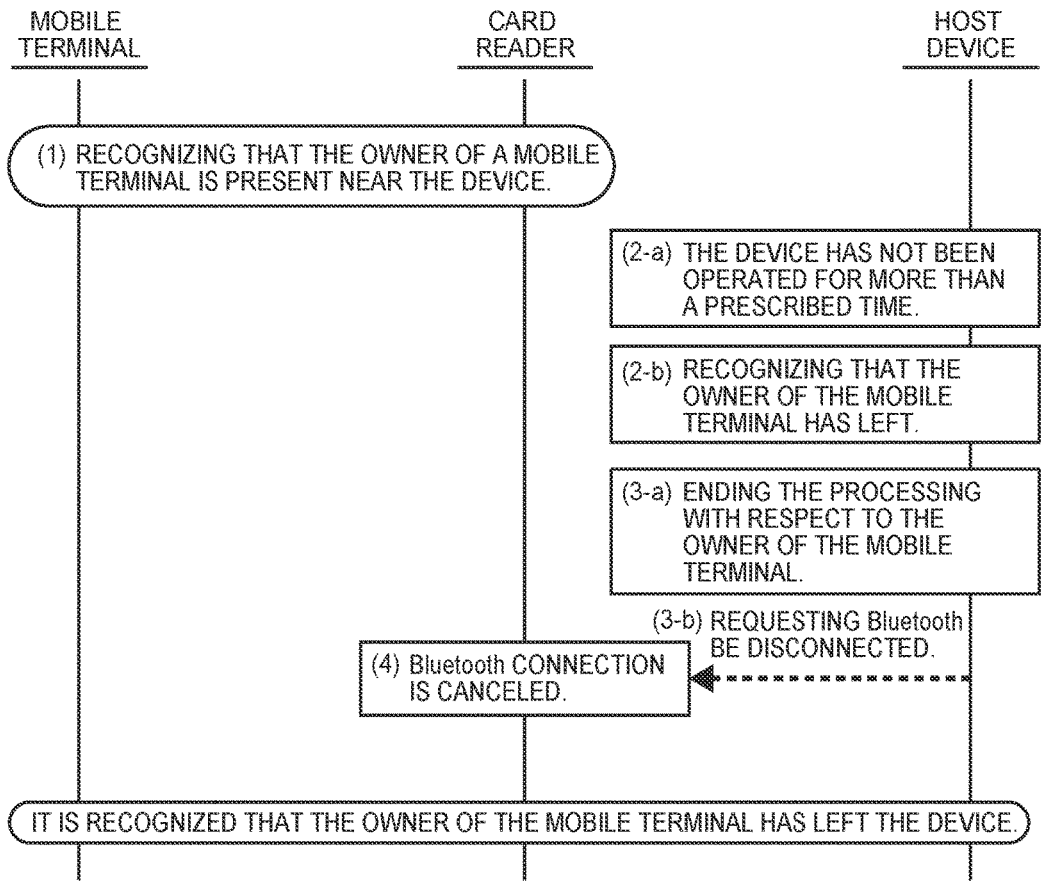
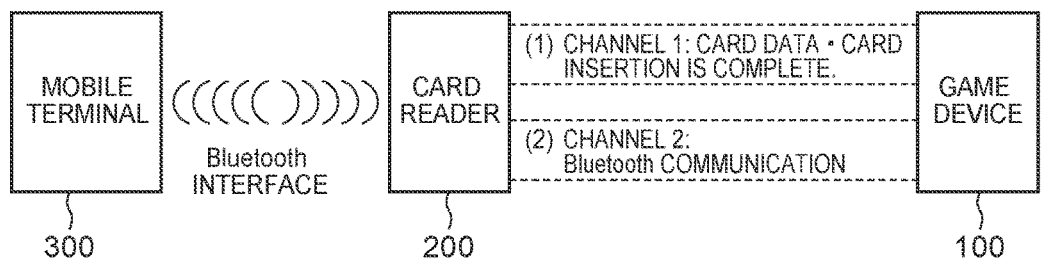

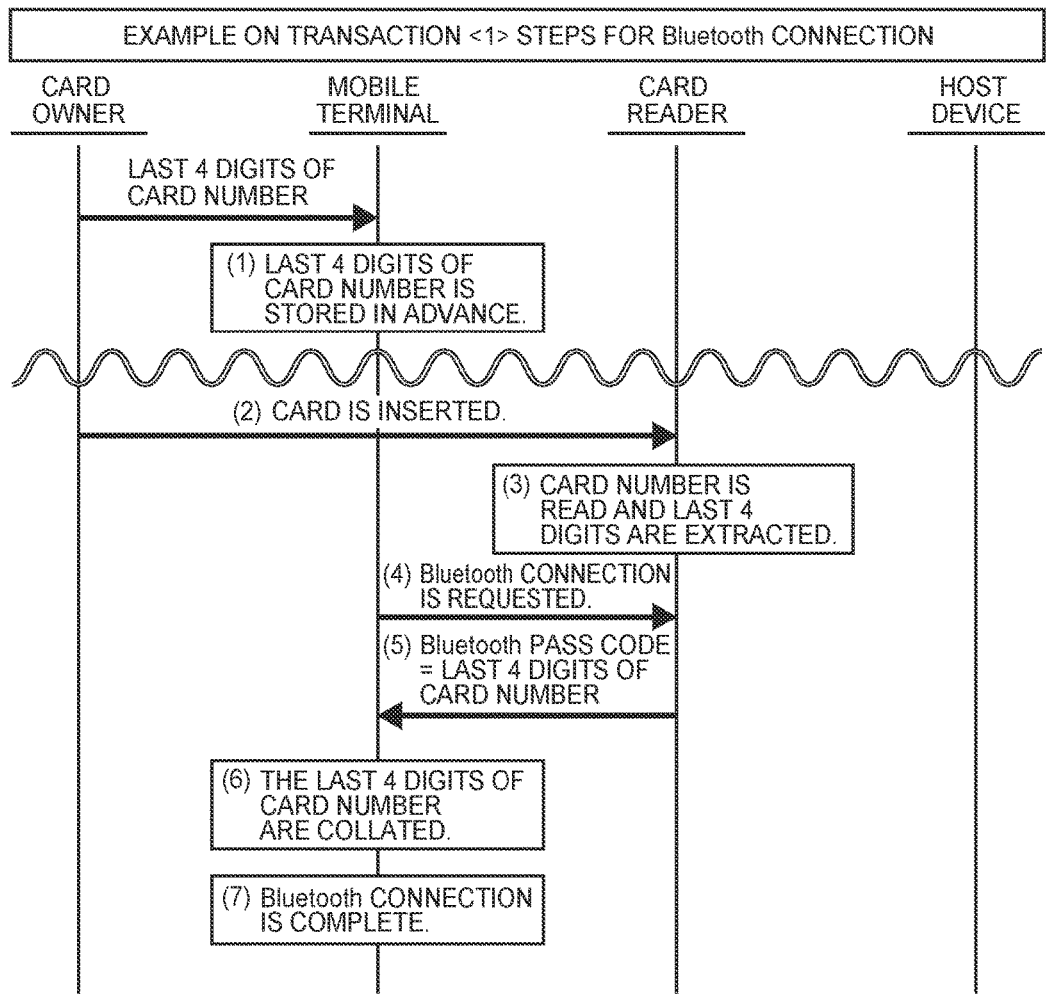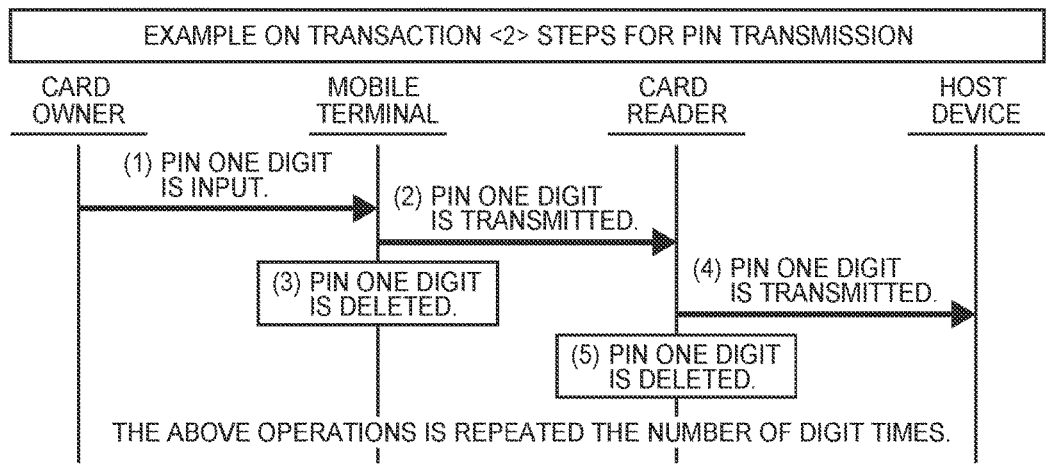

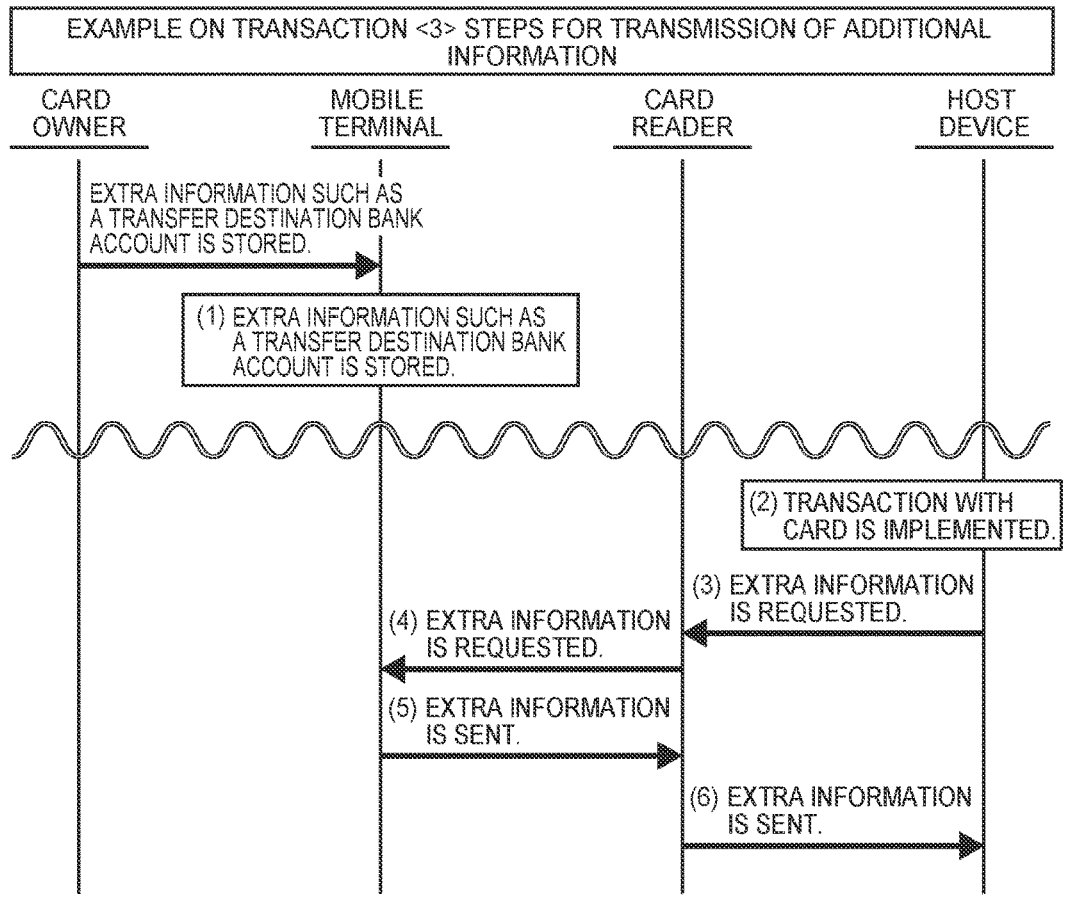
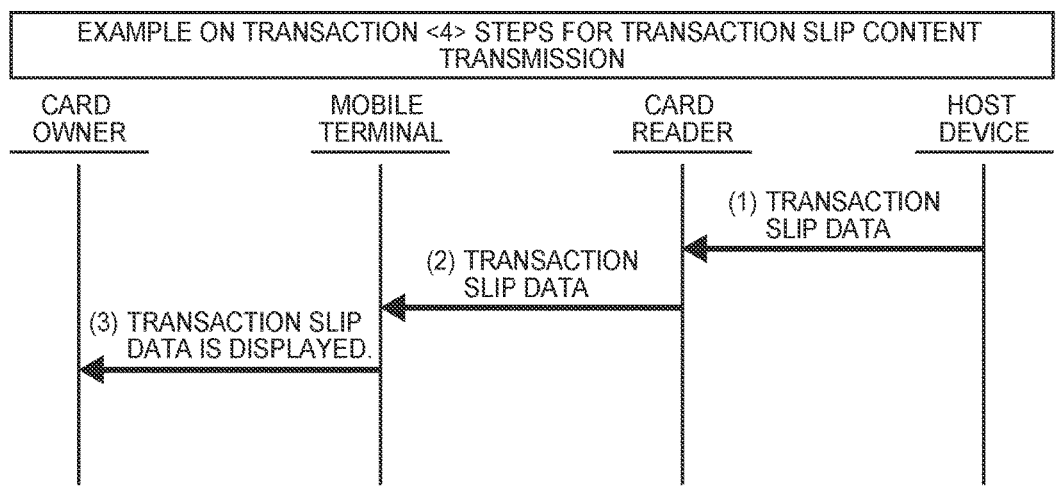

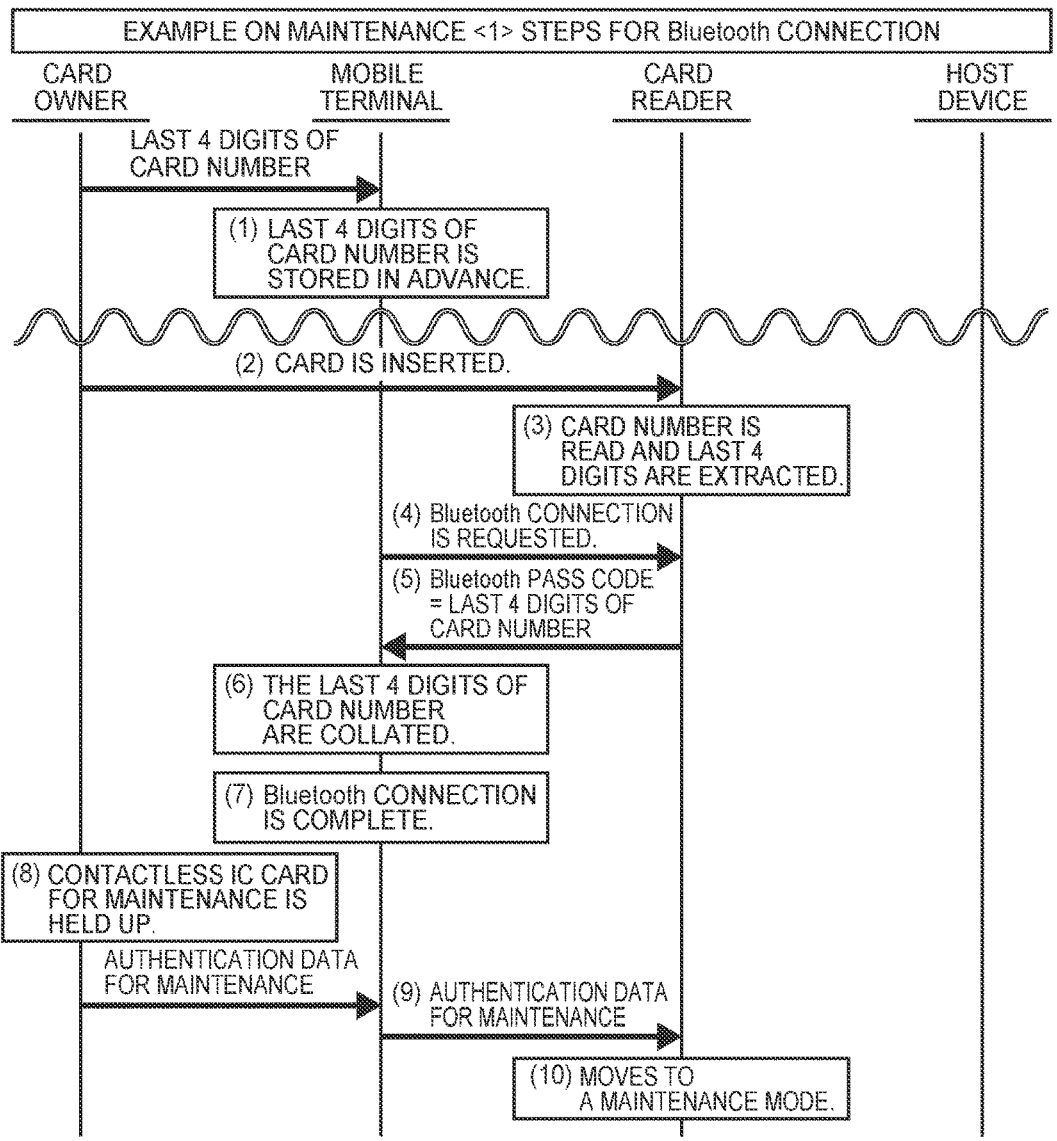
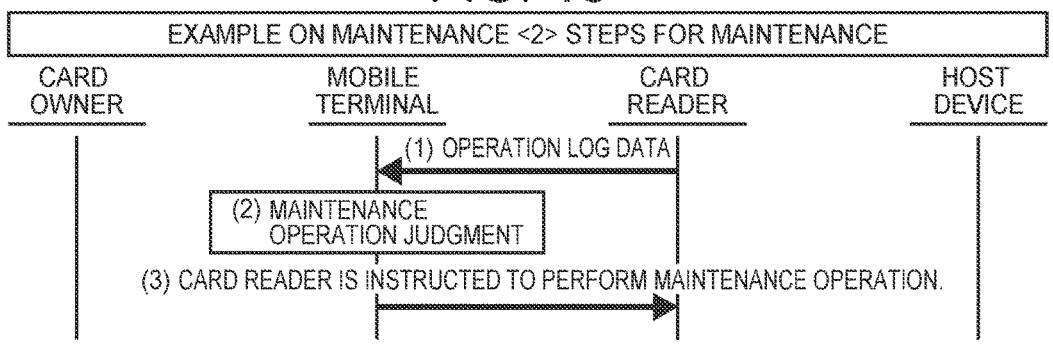

CARD READER

CROSS REFERENCE TO RELATED APPLICATIONS

This is the U.S. national stage of application No. PCT/JP2016/078148, filed on Sep. 26, 2016. Priority under 35 U.S.C. § 119(e) is claimed from U.S. Provisional Application 62/232,735, filed Sep. 25, 2015, and U.S. Provisional Application 62/247,382, filed Oct. 28, 2015; the disclosures of which are incorporated herein by reference.

FIELD OF TECHNOLOGY

At least an embodiment of the present invention relates to a card reader capable of transmitting data to and from a mobile terminal via wireless communication.

BACKGROUND

Conventionally, a card reader that reads data recorded on a card and records data on a card is widely used. This type of card reader is installed and used in an ATM (Automated Teller Machine), a CD (Cash Dispenser) or a game device at Casino, such as a slot machine (hereinafter called "a host device").

In recent years, a system has been disclosed which makes a mobile terminal to read information recorded on a card, such as customer identification information, and settles with a host device via wireless communication such as Wi-Fi or Bluetooth (registered trademark) (Patent Reference 1, for example). Also, another card reader has been disclosed which is equipped with a magnetic card reading function and a contact IC card communication function and is connected to a host device via a wireless communication interface (Patent Reference 2, for example).

PATENT REFERENCE

[Patent Reference 1] U.S. Pat. No. 8,127,999
[Patent Reference 2] U.S. Pat. No. 9,063,737

In the system disclosed in Patent Reference 1, however, a problem is that the host device is required to be compatible with both the card reader interface and the mobile terminal wireless communication interface. In other words, the host device needs to be equipped with two kinds of interface, one for a card reader and one for wireless communication, and the mobile terminal needs to be equipped with interfaces that can respectively support them. A game device monitors that a card reader is holding a card to recognize that a player is playing; however, this cannot be recognized with a temporary card information transmission through a wireless communication interface.

Also, in the card reader disclosed in Patent Reference 2, the wired communication interface which connects the card reader with a host device is replaced by a wireless communication interface; however, this does not demonstrate new convenience from mounting a wireless communication interface.

SUMMARY

At least an embodiment of the present invention, provides a card reader which supports a mobile terminal without changing the application software of the host device. Also, at least an embodiment of the present invention provides a card reader which is capable of exchanging data with a mobile terminal and capable of controlling the mobile terminal.

Therefore, at least an embodiment of the present invention configures a card reader which is equipped with a host connecting interface for connecting with a host device of a system and a wireless communication interface for connecting with a mobile terminal, and has a wireless user interface for communicating with the host device through the host connecting interface and communicating with the mobile terminal through the wireless communication interface.

According to this configuration, a wireless communication interface is additionally mounted to provide a card reader with a host connecting interface and a wireless communication interface so that the card reader exchanges data with the mobile terminal via the wireless communication interface while it also exchanges data with the host device via the host connecting interface.

Therefore, without providing the host device with two kinds of interface, one for a card reader and one for wireless communication, the host device can exchange not only the information of a card but also the information of a mobile terminal with the card reader. For this reason, new convenience from mounting a wireless communication interface in the card reader can be provided.

BRIEF DESCRIPTION OF DRAWING

Embodiments will now be described, by way of example only, with reference to the accompanying drawings which are meant to be exemplary, not limiting, and wherein like elements are numbered alike in several Figures, in which:

FIG. 3 is a block diagram of the configuration of a mobile terminal which communicates with the card reader of Embodiment 1.

FIG. 4 is a control processing flow showing steps of Bluetooth connection between the mobile terminal and the card reader.

FIG. 5 is a control processing flow showing steps of card data processing among the mobile terminal, the card reader and the game device.

FIG. 8 is a control processing flow showing processing steps of the third method, which detects among the mobile terminal, the card reader and the game device that an owner of the mobile terminal has left the game device.

FIG. 9 is a block diagram of the communication support for other data beside the card data via Bluetooth communication between the card reader and the mobile terminal.

FIG. 13 is a transaction processing flow showing the steps of Bluetooth connection among the card owner, the mobile terminal and the card reader.

FIG. 14 is a transaction processing flow showing the steps of PIN transmission among the card owner, the mobile terminal, the card reader and the automated transaction machine.

FIG. 15 is a transaction processing flow showing the steps of the extra information transmission among the card owner, the mobile terminal, the card reader and the automated transaction device.

FIG. 16 is a transaction processing flow showing the steps of transaction slip content transmission among the card owner, the mobile terminal, the card reader and the automated transaction device.

FIG. 17 is a maintenance processing flow showing the steps of Bluetooth connection during maintenance among the card owner, the mobile terminal, the card reader, and the automated transaction device.

FIG. 18 is a maintenance processing flow showing the maintenance steps between the mobile terminal and the card reader.

DETAILED DESCRIPTION (Embodiment 1)

Next, at least an embodiment of the present invention is described further in detail, referring to the attached drawing.

Figure 1:
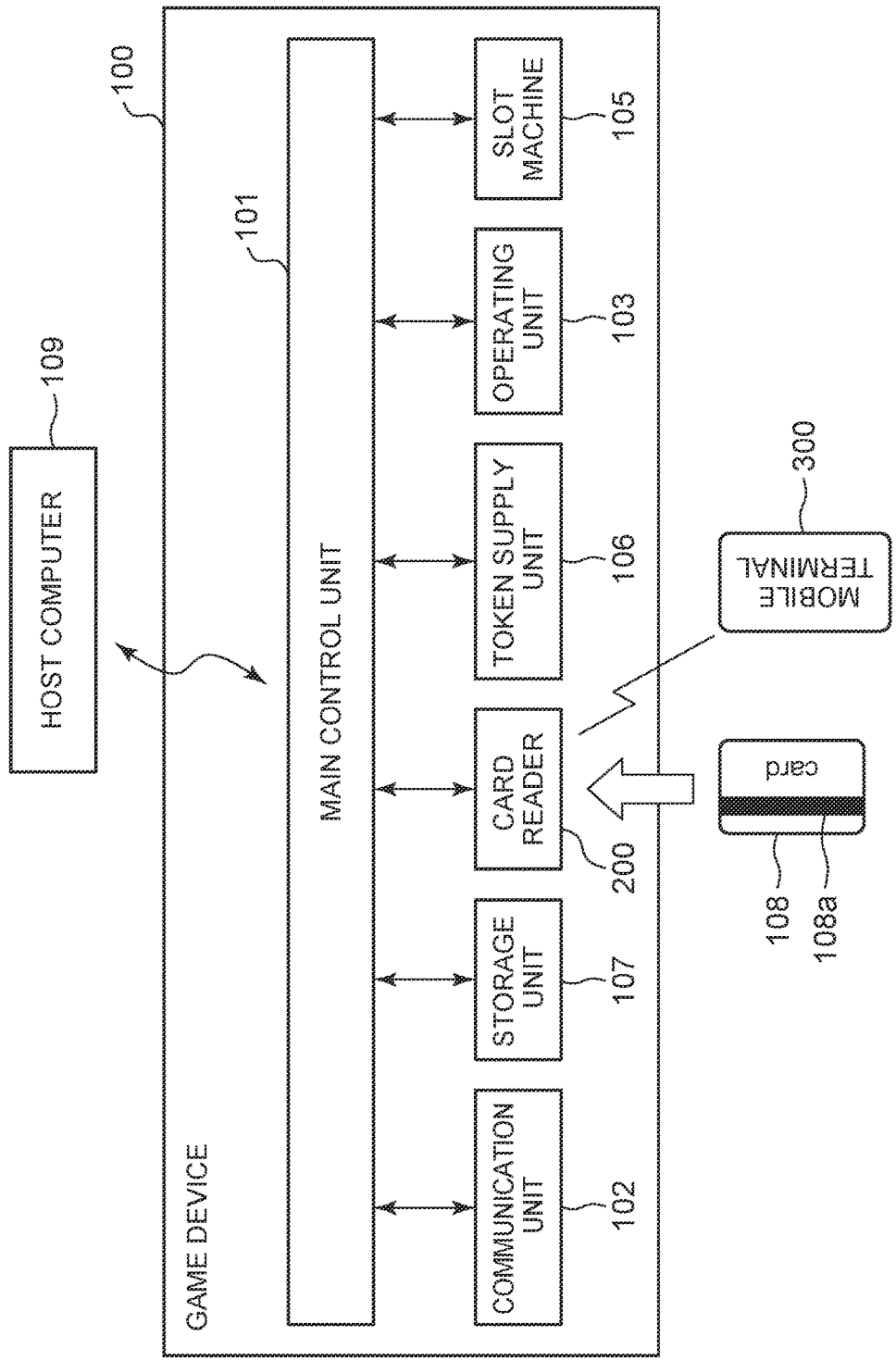
FIG. 1 is a block diagram of the configuration of a game device in which a card reader of Embodiment 1 of the present invention is mounted.
Figure 2:
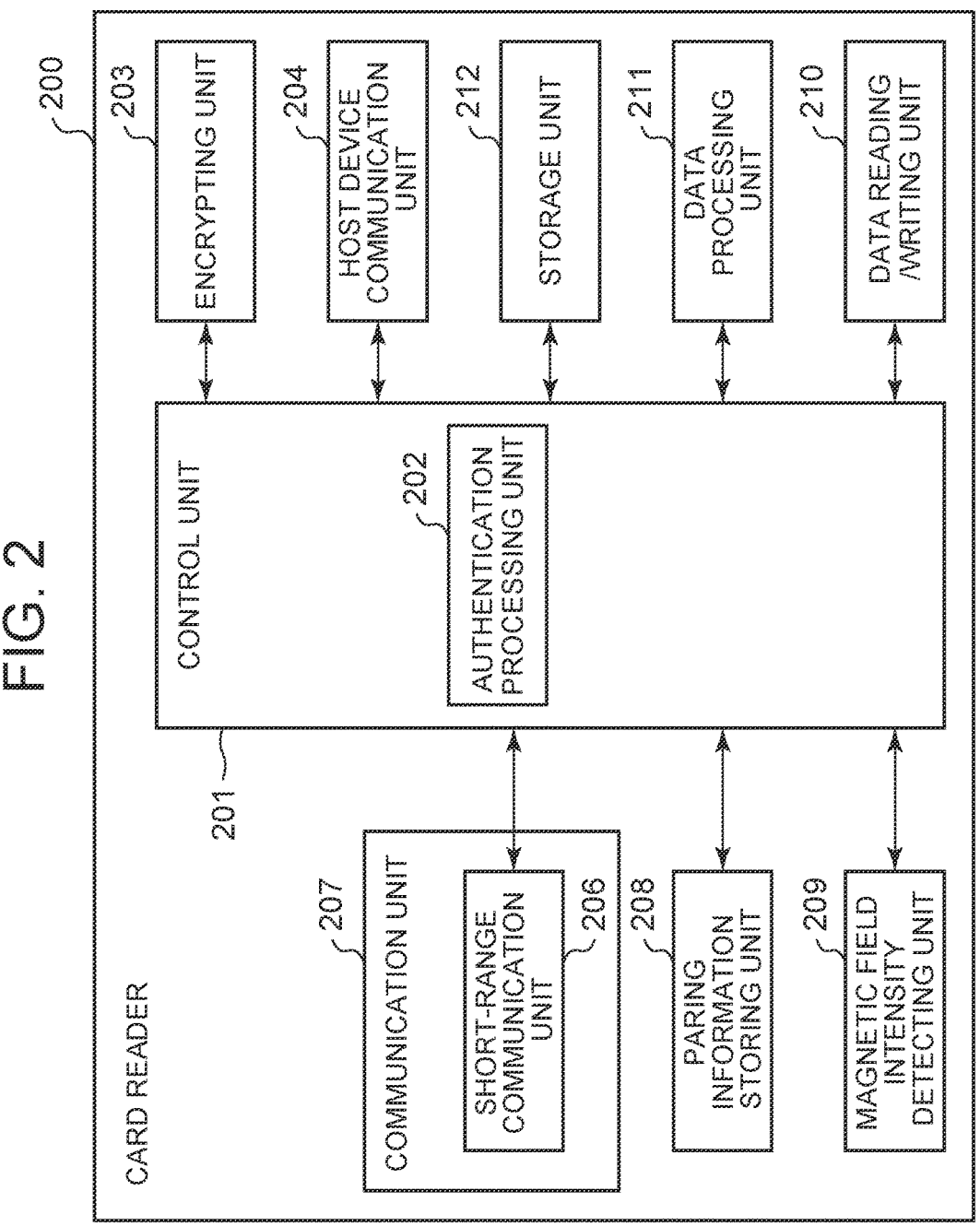
FIG. 2 is a block diagram of the configuration of the card reader of Embodiment 1.

FIG. 1 is a block diagram of the configuration of a host device in which a card reader of Embodiment 1 of the present invention is mounted. FIG. 2 is a block diagram of the configuration of the card reader, and FIG. 3 is the configuration of a mobile terminal of Embodiment 1.

(Game Device as a Host Device)

The host device used in Embodiment 1 is a game device 100 which is specifically a slot machine 105. For the slot machine 105 installed in a game parlor, tokens are used for the play medium. A token supply unit 106 supplies tokens. In recent years, as a card 108 is inserted into a card reader 200, token information can directly be fed to the slot machine 105 by operating a button.

The game device 100 used in Embodiment 1 is, as shown in FIG. 1, configured by a main control unit 101, a communication unit 102, a storage unit 107, the card reader 200, the token supply unit 106, an operation unit 103, and the slot machine 105.

The main control unit 101 controls each section of the game device 100. The main control unit 101 is equipped with a CPU (central processing unit), a ROM (read only memory), and a RAM (random access memory). In the ROM, a program that administers the basic control of each unit of the game device 100 is stored. The RAM is used as a CPU work area.

The communication unit (the communication interface) 102 controls the communication with a host computer 109.

The operation section 103 displays a touch panel on its screen and implements the operation selected by an operation lever or an operation button on the touch panel which a player's finger touches.

The slot machine 105 is provided, although not illustrated, with a drum portion, a token slot, a lever, and a stop button which functions to operate the game play.

When the card 108 such as a magnetic card or an IC card is inserted to the card reader 200, the token supply unit 106 supplies tokens within the remaining balance on the card 108.

(Card Reader)

The card reader 200 is connected to an automated transaction device which is arranged in a store to read magnetic data recorded on the card 108 and record magnetic data on the card 108.

A control unit 201 is configured by a CPU, a ROM, a RAM, etc., and each configuration component of the card reader 200 is connected to the control unit 201 to implement the controls on a communication protocol processing, for example, according to the software stored in the ROM to realize the card reader function. The control unit 201 is also provided with an authentication processing section 202 to implement authentication to judge whether the user of the card 108 is a legal owner [of the card 108]. Further, the memory unit 212 stores various data needed to control the card reader.

An encryption processing unit 203 implements encryption on the data to be sent and decryption on the received data when communications are made between the game device 100 and the mobile terminal 300, etc. under the control of the control unit 201.

A host device communication unit 204 is a communication interface which is connected to the game device 100, which is a host device, via a USB or an RS232C, for communication. Through this connection, the card reader 200 is controlled by the game device 100.

A pairing information storage unit 208 in the card reader stores pairing information necessary to set up a short-range communication which is implemented by a short-range communication unit 206. The paring information includes specific device address (hereinafter called "reader-writer address") such as IP addresses allocated to discriminate the card reader 200 for a short-range communication and an authentication key shared by the mobile terminal 300. In the paring information storage unit 208, the mobile address of the mobile terminal 300 with which a pairing is already done is stored. In this embodiment, the pairing is done in the card reader 200 using the specific device address which is obtained at the short-range communication unit 206.

The card reader 200 obtains the information to confirm whether the user of the card 108 such as an IC card is its legal owner, by using a communication unit 207 which has the short-range communication.

The short-range communication unit 206 is a wireless communication interface for wireless communication such as Bluetooth communication with a short-range communication unit 303 of the mobile terminal 300 which is placed within a short range.

The short-range communication unit 206 and the short-range communication unit 303 communicate with each other, when the user of the mobile terminal 300 holds up to the mobile terminal 300, to implement the processing to confirm whether the user of the mobile terminal 300 is its legal owner. At that time, it is desirable to set the communicable range within 1m or less to prevent operational errors such as communicating with another mobile terminal 300.

To a data reading/writing unit 210, a card 108 such as a magnetic card, a contact type IC card or a contactless IC card is inserted. The card reader 200 reads magnetic data recorded in a magnetic strip 108a of the inserted card 108 or the data of the IC mounted on the card 108, such as the card number, and writes specified information on the card with the card reading/writing unit 210 under the control of the control unit 201. With the reading and writing of the data, the card reader 200 makes transactions of money or the like.

The data reading/writing unit 210 is provided with a magnetic head for transmitting data to and from the magnetic strip 108a of the card 108 and IC contacts for transmitting data to and from the IC terminal portion of the card 108. The data reading/writing unit 210 transmits data to and from the magnetic strip 108a through the magnetic head and transmits data to and from the IC terminal portion of the card 108 through the IC contacts. Also, the unit 210 performs a data transmission with a communication antenna on the card 108, using a contactless communication antenna provided in the card reader 200. By this transmission, the data reading/writing unit 210 writes and/or reads data with respect to the card 108 provided with multiple card functions such as the contactless IC card function, the contact IC card function and the magnetic card function.

A data processing unit 211 processes the data recorded on the card 108. The data processing unit 211 reads the information recorded on the card 108 and writes new information if necessary.

(Mobile Terminal)

The mobile terminal 300 is an electronic device that one can carry around in hand and is equipped with a control unit 301, an information display unit 304 such as a touch panel, and a wireless communication unit 302 and a short-range communication unit 303 as information communication units.

The control unit 301 is configured by a CPU, a ROM and a RAM, and is connected to each configuration component of the mobile terminal 300 to perform the controls over the components according to the software stored in the ROM so that the mobile terminal functions can be realized.

A speaker 305 and a microphone 306 are connected to a sound I/F unit 307 and used as a sound output unit. The sound I/F unit 307 performs an A/D conversion or a D/A conversion of analogue/digital sound signals as well as an audio codec processing in accordance with the predetermined wireless band. The display unit 304 displays various information such as the status information of the mobile terminal 300. The operation unit 308 is configured by a numeric keypad, etc., used by the user of the mobile terminal 300 to input information.

A card data memory unit 309 stores the card data such as a card ID or the card reader information which the mobile terminal 300 has received from the card 108.

An authentication information input unit 310 together with an authentication information storage unit 311 configures an authentication processing unit 312; the authentication information input unit 310 is a biometric sensor, for example, to input physiological information of a user of the mobile terminal 300, thus, inputting the information for authentication. The physiological information is, for example, finger print data, veins data, etc. The authentication information storage unit 311 stores in advance the physiological information of the owner of the mobile terminal 300. When writing a card ID or data of a mobile terminal, the authentication processing unit 312 compares the physiological information input by the authentication information input unit 310 with the physiological information stored in the authentication information storage unit 311 to verify that the user of the mobile terminal 300 is its owner. Note that a case of authentication by physiological information is described as an example hereinafter; however, authentication may be performed by using a personal identification number instead of physiological information. However, it is desirable that authentication be performed using physiological information so that security is improved.

The pairing information storage unit 313 in the mobile terminal stores the pairing information which is needed for a connection setting of short-range communication, in the same manner as the pairing information storage unit 208 in the card reader. The pairing information includes the authentication key. Also, the pairing information storage unit 313 in the mobile terminal stores the card reader address of the card reader 200 with which a pairing is already done. In this embodiment, the pairing in the mobile terminal 300 is implemented using the specific device address obtained by the short-range communication unit 303.

An encryption processing unit 315 implements encryption processing on the data which is to be sent and decryption processing on the received data under the control of the control unit 301 when the communication is made between the card 108 and the card reader 200.

(Major Effects)

According to such a card reader 200, the short-range communication unit 206 is additionally mounted in the card reader 200 as the wireless communication interface, and also the host device communication unit 204 as the host connecting interface and the short-range communication unit 206 as the wireless communication interface are provided to the card reader 200 so that the card reader 200 can exchange information with the mobile terminal 300 via the short-range communication unit 206 and can exchange the information with the game device 100, which is a host device, via the host device communication unit 204. Therefore, unlike a conventional configuration in which two kinds of interfaces are provided, one for a card reader and one for wireless communication, the game device 100 which is a host device can exchange information of the mobile terminal 300 in addition to the information of the card 108 with the card reader 200. Also, the card reader 200 can be controlled by the mobile terminal 300 which is made as a temporal host device. Therefore, it is possible to demonstrate new convenience obtained by mounting the wireless communication interface in the card reader 200.

(Control Method)

Next, the control processing on the game device 100 in which the card reader 200 of Embodiment 1 is installed is described referring to FIG. 4 through FIG. 9.

(Bluetooth Connection Steps)

FIG. 4 is a control processing flow of the steps for Bluetooth connection between the mobile terminal 300 and the card reader 200.

The control unit 201 controls the short-range communication unit 206 to implement Bluetooth communication with the mobile terminal 300 by the wireless communication interface by using a low communication output before the connection with the mobile terminal 300 and by using a high communication output after the connection with the mobile terminal 300. At that time, the control unit 201 connects with the mobile terminal 300 which has read the specific information assigned to it among unique information respectively assigned to different card readers 200, through a Bluetooth connection by the short-range communication unit 206. The unique information is given differently to individual card readers 200 by mounting in the card reader 200 or in the game device 100 having the card reader 200 mounted an RFID tag or a barcode label in which a different value is written for each individual card reader 200.

In other words, as shown by (1) in FIG. 4, the card reader 200 controls the Bluetooth transmission by suing a low transmission output when not connected with the Bluetooth so that, even in the environment in which many card readers 200 or game devices 100 having a Bluetooth interface mounted are present, the number of devices to be detected by the mobile terminal 300 is minimized, facilitating the connection with a specific card reader 200.

The owner of the mobile terminal 300 operates the application software installed in the mobile terminal 300 at the operation unit 308 to read the RFID tag or the barcode indicated on the card reader 200 or the game device 100 to which the connection is desired and obtain the specific information of the card reader 200 to be connected, as shown by (2) in the figure.

As shown by (3) in the figure, the mobile terminal 300 specifies the card reader 200, to which the connection is desired, among the detected, multiple Bluetooth devices by using the obtained specific information and connects to it. Upon this connection, the card reader 200 detects that it is connected to the mobile terminal 300 through the Bluetooth connection, and as shown by (4) in the figure, controls the short-range communication unit 206 to increase the Bluetooth transmission output to the level at which the owner of the mobile terminal 300 can stably transmit at the distance to operate the game device 100.

(Effects of the Embodiment)

Thus, the control unit 201 controls the setting of the Bluetooth communication by using a low transmission output before the connection and a high output after the connection so that the mobile terminal 300 can specify and select the connection destination from the multiple Bluetooth-mounted devices which are in proximity. Also, by mounting the RFID tag or barcode label in which unique values are written according to different card readers 200 or the game device 100 in which the card reader 200 is mounted and reading it with the mobile terminal 300 to make the specific card reader 200 Bluetooth-connectable, the card reader 200 to which the mobile terminal 300 is connected can be specified from the multiple card readers 200 having Bluetooth mounted.

Note that, in the above description, on the card reader side, the control unit 201 controls the Bluetooth transmission by suing a low output when the Bluetooth connection is not on, as indicated by (1) in the figure and outputs to the mobile terminal the specific information of the card reader to be connected as shown by (2) in the figure; the mobile terminal obtains the specific information of the connecting card reader 200, as shown by (3) in the figure. However, if a single card reader 200 can be specified among the multiple card readers 200 which have been detected, the Bluetooth transmission output may be controlled to be low (1) or the unique information of the card reader 200 may be obtained (2).

(Card Data Processing Steps)

FIG. 5 is a control processing flow of the steps of a card data processing among the mobile terminal 300, the card reader 200 and the game device 100 which is a host device.

The control unit 201 receives the card data held in the mobile terminal 300 via the short-range communication unit 303 and the short-range communication unit 206, processes the received card data at the data processing unit 211 to hold it as the data read from the card 108, and then sends it to the game device 100 via the host device communication unit 204. Also, in the case that the control unit 201 judges from the Bluetooth connection status between the mobile terminal 300 and the card reader 200 which have received the card data, detected by a radio wave intensity detecting unit 209, that the owner of the mobile terminal 300 is present at the position at which the game device 100 can be operated, the control unit 201 notifies the game device 100 of the card insertion status.

In other words, as shown by (1) in FIG. 5, the mobile terminal 300, upon detecting the Bluetooth connection with the card reader 200, sends the card data to the card reader 200 via the Bluetooth. Upon receiving the card data from the mobile terminal 300 in a normal manner and recognizing from the Bluetooth connection status between the mobile terminal 300 and the card reader 200 by the control unit 201 that the owner of the mobile terminal 300 is present at the position at which the game device 100 can be operated, the card reader 200 sends to the game device 100 the information indicating the card insertion is completed, as shown by (2) in the figure. Notified that the card insertion is completed, the game device 100 recognizes that the card 108 has been inserted into the card reader 200, and then, as shown by (3) in the figure, requests the card data of the card reader 200. Upon receiving the request of the card data, the card reader 200 sends the card data to the game device 100 as shown by (4) in the figure.

(Major Effects)

In the above manner, the short-range communication unit 206 is additionally mounted beside the host device communication unit 204 which is the host connecting interface for the connection with the game device 100 and the card reader 200 receives the card data held by the mobile terminal 300 via the Bluetooth and sends it to the game device 100 as the data read from the card 108 to be able to support the mobile terminal 300 without changing the application software of the game device 100. Also, the card reader has a function to recognize from the Bluetooth connection status with the mobile terminal 300, which has received the card data, that the owner of the mobile terminal 300 is present at the position at which the game device 100 can be operated and to notify it to the game device 100 in the same manner as the card insertion status, so that the game device 100 can recognize the connection status of the mobile terminal 300 without changing the application software of the game device 100.

Note that an error processing that needs to be done when the card reader 200 could not normally receive the card data may be unnecessary in the game device 100 with the card reader 200 notifying the completion of the card insertion to the game device 100 at the same time as the card data is normally received, not at the Bluetooth connection. Also, in the above description, the RS232C or the USB interface is supposed to be the host device communication unit 204; after the card reader 200 sends the game device 100 the information indicating the card insertion completion as shown by (2) in the figure, the game device 100 requests the card data of the card reader 200 as shown by (3) in the figure. However, when the host device communication unit 204 uses a TTL interface which transmits card data to the game device 100 successively while the card 108 is being inserted, the information indicating the card insertion completion may be transmitted to the game device after the card data transmission is completed.

Since the fact that the owner of the mobile terminal 300 is present in front of the game device 100 is detected by using the Bluetooth radio wave intensity which is detected by the radio wave intensity detecting unit 209 in the above-described manner, it is desirable that the operation of the radio wave intensity automatic adjustment function in the Master-Slave relationship standardized by Bluetooth be restricted. Also, the surrounding environment of the card reader 200 and the mobile terminal 300 affects the radio wave intensity of the Bluetooth communication; besides, the card reader 200 needs to be compatible with many kinds of mobile terminals 300 having different characteristics. Further, the card reader 200 needs to have measures preventing the mislaying of the mobile terminal 300 or the hacking of the game device 100 taking advantage of the mobile terminal which is intentionally left behind. Therefore, it is desirable to implement the processing to detect that the owner of the mobile terminal 300 has left the game device 100, by combining three methods which are described below referring to FIG. 6 through FIG. 8.

(First Method to Detect That a Mobile Terminal Owner Has Left a Host Device)

Figure 6:
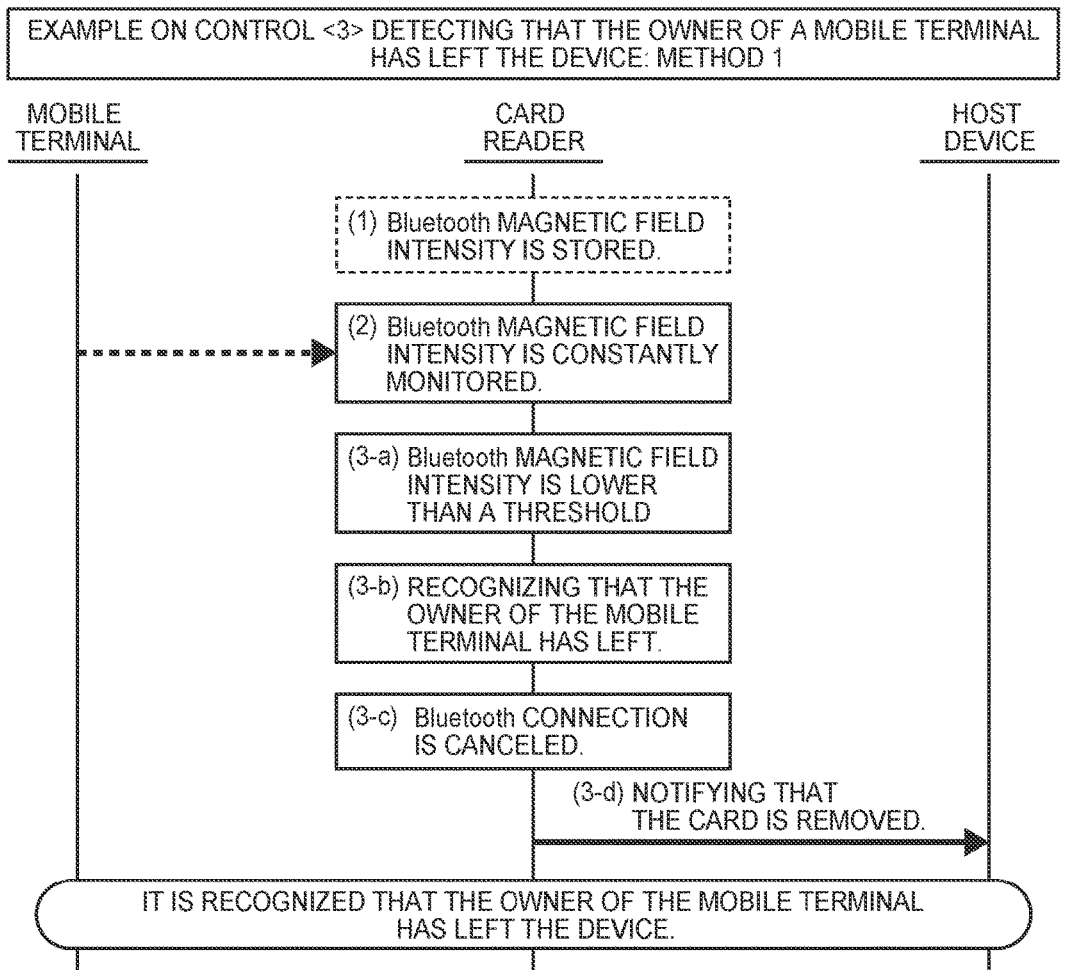
FIG. 6 is a control processing flow showing the processing steps in the first method to detect among the mobile terminal, the card reader and the game device that an owner of the mobile terminal has left the game device.

FIG. 6 is a control processing flow of the processing steps in a first method to detect among the terminal device 300, the card reader 200 and the game device 100 that the owner of the mobile terminal 300 has left the game device 100.

When judging, based on the amount of change in the Bluetooth communication radio wave intensity with the mobile terminal 300, which is detected by the radio wave intensity detection unit 209, from the Bluetooth communication radio wave intensity stored immediately after the Bluetooth connection is made with the mobile terminal 300, that the owner of the mobile terminal 300 has left the position at which the game device 100 can be operated, the control unit 201 disconnects the Bluetooth connection with the mobile terminal 300 which is made through the short-range communication unit 206 and notifies the game device 100 of the card removal status.

In other words, as shown by (1) in FIG. 6, the card reader 200 stores in the memory unit 212 as memory the Bluetooth communication radio wave intensity from the mobile terminal 300 obtained when receiving the card data from the mobile terminal 300. The card reader 200 constantly monitors the Bluetooth communication radio wave intensity from the mobile terminal 300 with the radio wave intensity detection unit 209 as shown by (2) in the figure. When detecting that the Bluetooth communication radio wave intensity from the mobile terminal 300 becomes lower than a threshold based on its change amount as shown by (3-a) in the figure, the card reader 200 recognizes that the owner of the mobile terminal 300 has left the game device 100 as shown by (3-b) in the figure, disconnects the Bluetooth connection as shown by (3-c) in the figure, and notifies the game device 100 of the card removal status as shown by (3-d) in the figure.

(Major Effects)

Thus, it is judged, from the amount of change in the Bluetooth communication radio wave intensity stored on the card reader 200 immediately after the Bluetooth connection is made, whether the owner of the mobile terminal 300 is present at the position at which the game device 100 can be operated; when it is judged that the mobile terminal 300 has left, the Bluetooth connection is automatically canceled, and the game device 100 is notified of the card removal status so that the game device 100 can recognize the connection status of the mobile terminal 300 without changing the application software.

(Second Method to Detect That the Mobile Terminal Owner Has Left the Host Device)

Figure 7:
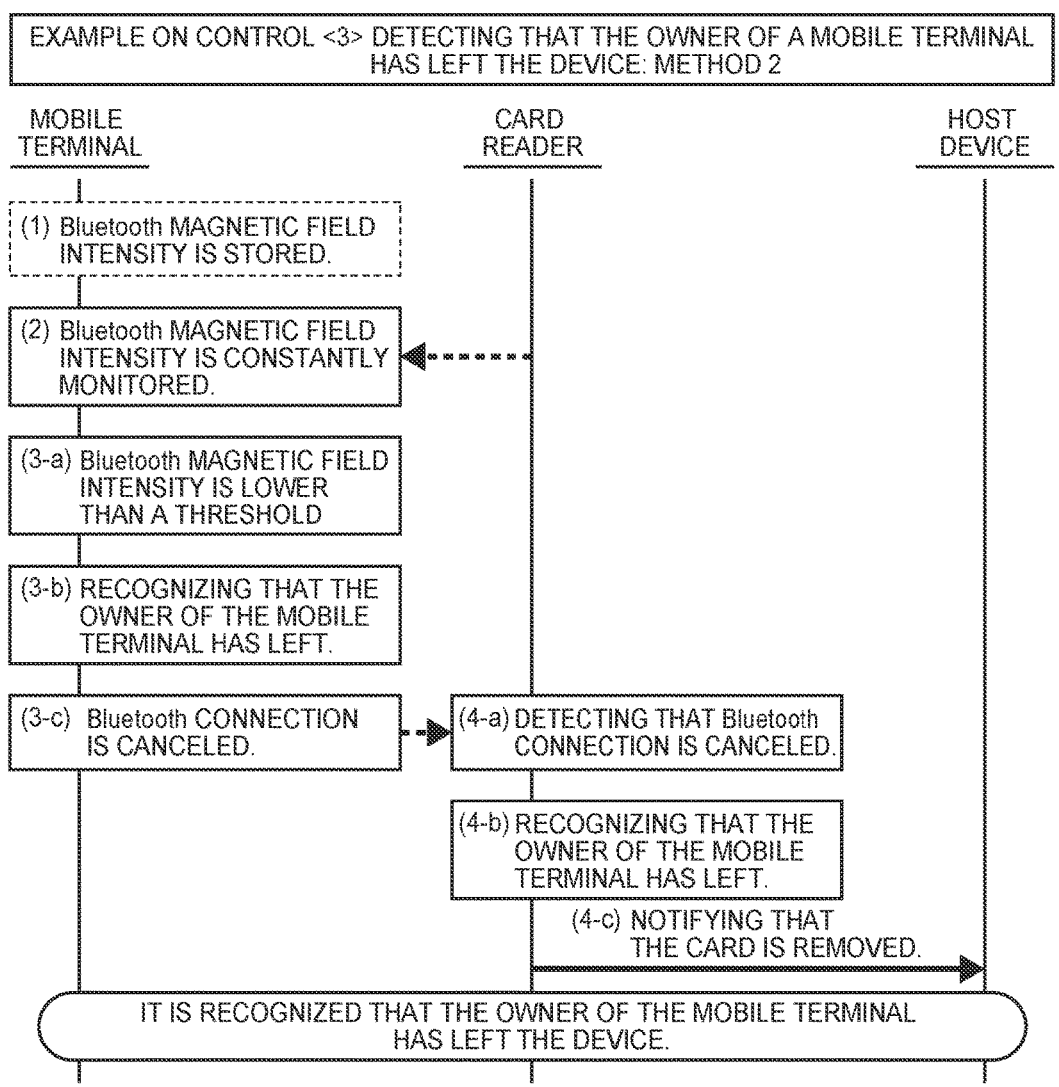
FIG. 7 is a control processing flow showing processing steps of the second method, which detects among the mobile terminal, the card reader and the game device that an owner of the mobile terminal has left the game device.

FIG. 7 is a control processing flow of the processing steps among the mobile terminal 300, the card reader 200 and the game device 100 in a second method to detect that the owner of the mobile terminal 300 has left the game device 100.

The control unit 201 notifies the game device 100 of the card removal status when the mobile terminal 300 judges, based on the amount of change in the Bluetooth communication radio wave intensity with the card reader 200 detected by the radio wave intensity detecting unit 314 from the Bluetooth communication radio wave intensity stored immediately after the Bluetooth connection is made with the card reader 200, that the owner of the mobile terminal 300 has left the position at which the owner of the mobile terminal 300 can operate the game device 100.

In other words, as shown by (1) in FIG. 7, the mobile terminal 300 stores in memory the Bluetooth communication radio wave intensity with the card reader 200 when the card data is sent to the card reader 200. As shown by (2) in the figure, the mobile terminal 300 constantly monitors the Bluetooth communication radio wave intensity from the card reader 200 at the radio wave intensity detecting unit 314. As shown by (3-a) in the figure, when detecting, based on the amount of change, that the Bluetooth communication radio wave intensity from the card reader 200 becomes lower than a threshold, the mobile terminal 300 recognizes that the owner of the mobile terminal 300 has left the game device 100 as shown by (3-b) in the figure, and disconnects the Bluetooth connection as shown by (3-c) in the figure. When detecting that the Bluetooth connection with the mobile terminal 300 is canceled as shown by (4-a) in the figure, the card reader 200 recognizes that the owner of the mobile terminal 300 has left the game device 100 as shown by (4-b) in the figure, and notifies the game device 100 of the card removal status as shown by (4-c) in the figure.

Thus, it is judged, based on the change amount from the Bluetooth communication radio wave intensity stored on the card reader 200 immediately after the Bluetooth connection is established, whether the owner of the mobile terminal 300 is present at the position at which the game device 100 can be operated; when it is judged that the owner has left the mobile terminal 300, the mobile terminal 300 automatically disconnects the Blue tooth connection and lets the software installed on the mobile terminal 300 deal with it so that the situation that the card reader 200 failed to detect that the owner of the mobile terminal 300 has left from the game device 100 can be compensated.

(Third Method to Detect That the Mobile Terminal Owner Has Left the Host Device)

FIG. 8 is a control processing flow of the processing steps taken among the mobile terminal 300, the card reader 200 and the game device 100 in the third method to detect that the owner of the mobile terminal 300 has left the game device 100.

Even during the Bluetooth connection with the mobile terminal 300 and even when recognizing that the owner of the mobile terminal 300 is present at the position at which the game device 100 can be operated, the control unit 201 disconnects the Bluetooth connection which is made with the mobile terminal 300 by the short-range communication unit 206, responding to the Bluetooth disconnect request from the game device 100, which has judged that the owner of the mobile terminal 300 is not present in the vicinity of the game device 100 although the mobile terminal 300 is present near the game device 100 since there was no operation on the game device 100 for a given time.

In other words, as shown by (1) in FIG. 8, under the condition in which the card reader 200 and the mobile terminal 300 both have recognized from the Bluetooth communication radio wave intensity that the owner of the mobile terminal 300 is present in the vicinity of the game device, when the game device 100 detects that the game device 100 has not been operated for a given time or longer as shown by (2-a) in the figure, it recognizes that the owner of the mobile terminal 300 has left from the game device 100 as shown by (2-*b*) in the figure. In this case, the game device 100 ends the processing with respect to the owner of the mobile terminal 300 as shown by (3-*a*) in the figure, and instructs the card reader 200 to disconnect the Bluetooth communication as shown by (3-*b*). With this instruction, the card reader 200 disconnects the Bluetooth communication with the mobile terminal 300.

(Major Effects)

Thus, even under the condition that the Bluetooth connection is on and the card reader 200 recognizes that the owner of the mobile terminal 300 is present at the position at which the game device 100 can be operated, the card reader 200 responds to the Bluetooth disconnect request from the game device 100, which has judged that the owner of the mobile terminal 300 is not present near the game device 100 although the mobile terminal 300 is present near the game device 100 since there has been no operation of the game device 100 for a given time or longer; therefore, it is possible to prevent the mobile terminal 300 from being mislaid or the game device 100 from being hacked while the mobile terminal 300 is intentionally left near the game device. Therefore, the card reader 200 can properly cancel the processing with respect to the owner of the mobile terminal 300.

Also, when the card 108 is inserted into the data reading/writing unit during the Bluetooth connection which is made with the mobile terminal 300 through the short-range communication unit 206, the control unit 201 disconnects the Bluetooth connection and prioritizes the processing on the card data of the inserted card 108. Also, when the Bluetooth connection request is sent from the mobile terminal 300 while the card is inserted, the control unit 201 rejects the Bluetooth connection request. When there is a Bluetooth connection request from another mobile terminal 300 during the Bluetooth connection, the control unit 201 rejects the Bluetooth connection request from another mobile terminal 300.

(Major Effects)

As described above, when the card 108 is inserted into the data reading/writing unit 210 during the Bluetooth connection, the Bluetooth communication is disconnected and the processing on the card data of the inserted card 108 is prioritized; while the card 108 is being inserted, the Bluetooth connection request is rejected; while the Bluetooth connection is on, other Bluetooth connection requests are rejected. Therefore, the hacking of the use of the game device 100 through the Bluetooth communication, which is connectable from a distant place, can be prevented.

The card reader in Patent Reference 1 discloses a system that lets the mobile device read the information such as customer identification information recorded on a card and communicates with a Point of Service terminal (POS terminal) via Bluetooth for account settlement. The mobile terminal in this system is provided with a function of reading information recorded on a card or recording the same kind of information; the host device is equipped with a wireless communication interface to connect with the mobile terminal.

Conventionally, a casino game device recognizes that a legal player who is a card owner is playing, by monitoring that a card reader is holding a card. However, as in the above US patent, even if a wireless communication interface for connecting with a mobile terminal is provided to the system, the card reader in a game device cannot directly monitor that a card is held through a temporal card information transmission with the wireless communication interface; therefore, it is recognized that a legal player is playing.

According the card reader 200 of this embodiment, however, it can be prevented that the game device 100 is hacked by an illegal player, who is not the owner of the card 108.

(Other Communication Besides Card Data by Bluetooth Between Card Reader and Mobile Terminal)

FIG. 9 is a block diagram showing the communication support for other information besides card data through Bluetooth communication between the card reader 200 and the mobile terminal 300.

The host device communication unit 204 here uses a USB interface. The control unit 201 communicates the received card data and the information on the presence of the owner of the mobile terminal 300 with the game device 100 through a card reader logic channel in the USB interface in the same manner as the reading of the card 108. The information obtained through the Bluetooth communication with the mobile terminal 300, with which a conventional card reader interface is not compatible, is communicated with the game device 100 through another logic channel in the USB interface, which is assigned as a USB composite device.

In other words, the card reader 200 transmits the card data and the information of the presence of the owner of the mobile terminal 300, which is transmitted from the mobile terminal 300 through the Bluetooth communication, to the game device 100 by a conventional card reader interface function in the card reader logic channel in the USB interface indicated by a channel 1 shown by (1) in FIG. 9, in the same means as for the card reading. On the other hand, the information obtained from the mobile terminal 300 through Bluetooth, which cannot be handled by the conventional card reader interface function, is transmitted to the game device 100 through another logic channel mounted in the USB interface as a composite device, indicated by a channel 2 shown by (2) in FIG. 9.

As described above, the information obtained from the mobile terminal 300 through the Bluetooth communication, which is not compatible with a conventional card reader interface, is communicated with the game device 100 through another logic channel which is assigned as a USB composite device; thus, without changing the control processing on the game device 100 for a conventional card reading, different information obtained from the mobile terminal 300 through Bluetooth communication can be transmitted to the game device 100. As a result, the communication function of the card reader 200 can be expanded.

Note that, although in the above description the card data and the information of the presence of the owner of the mobile terminal 300 is notified to the game device 100 through the channel 1 shown by (1) which is the conventional card reader interface, the information can be notified through another communication logic channel shown by (2).

(Embodiment 2)

Next, Embodiment 2 of the present invention is described further in detail referring to the drawing.

Figure 11:
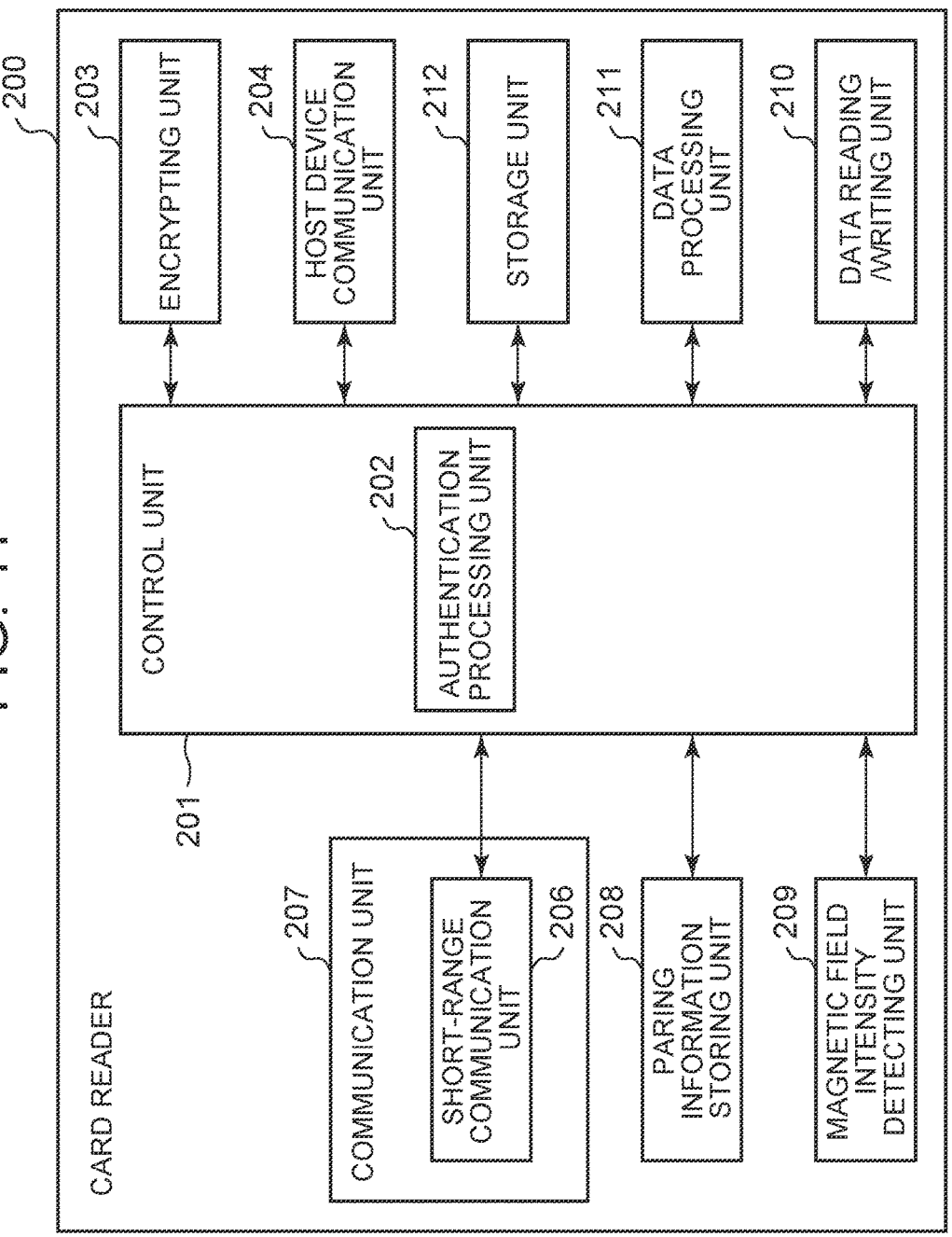
FIG. 11 is a block diagram of the configuration of the card reader of Embodiment 2.
Figure 12:
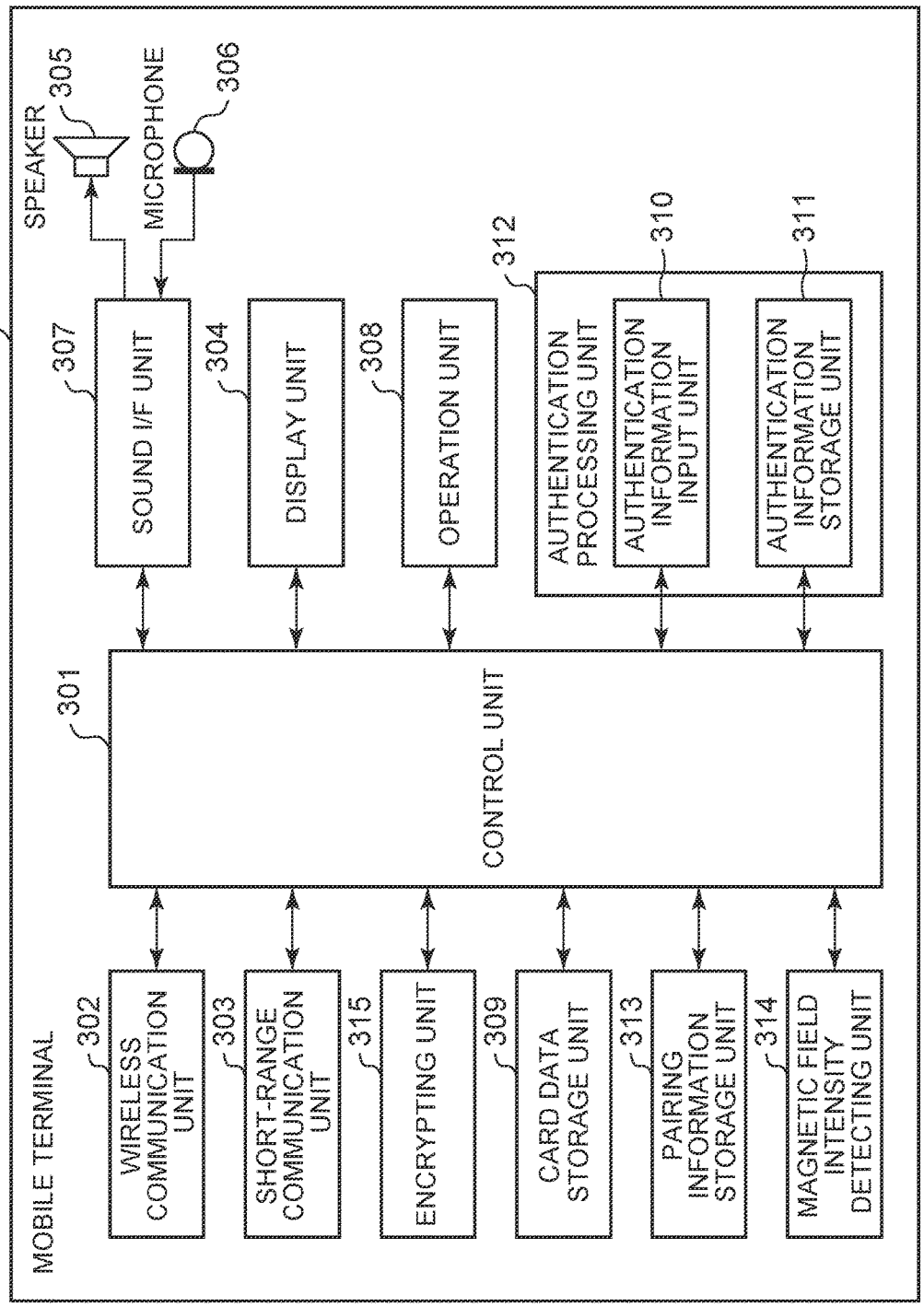
FIG. 12 is a block diagram of the configuration of a mobile terminal which communicates with the card reader of Embodiment 2.

The transaction processing performed with respect to a host device in which the card reader 200 of Embodiment 2 of the present invention is mounted, is described referring to FIG. 13 though FIG. 18. Note that the card reader 200 and the mobile terminal 300 used in Embodiment 2 are shown in FIG. 11 and FIG. 12 and configured the same as the hardware configuration shown by FIG. 2 and FIG. 3.

Figure 10:
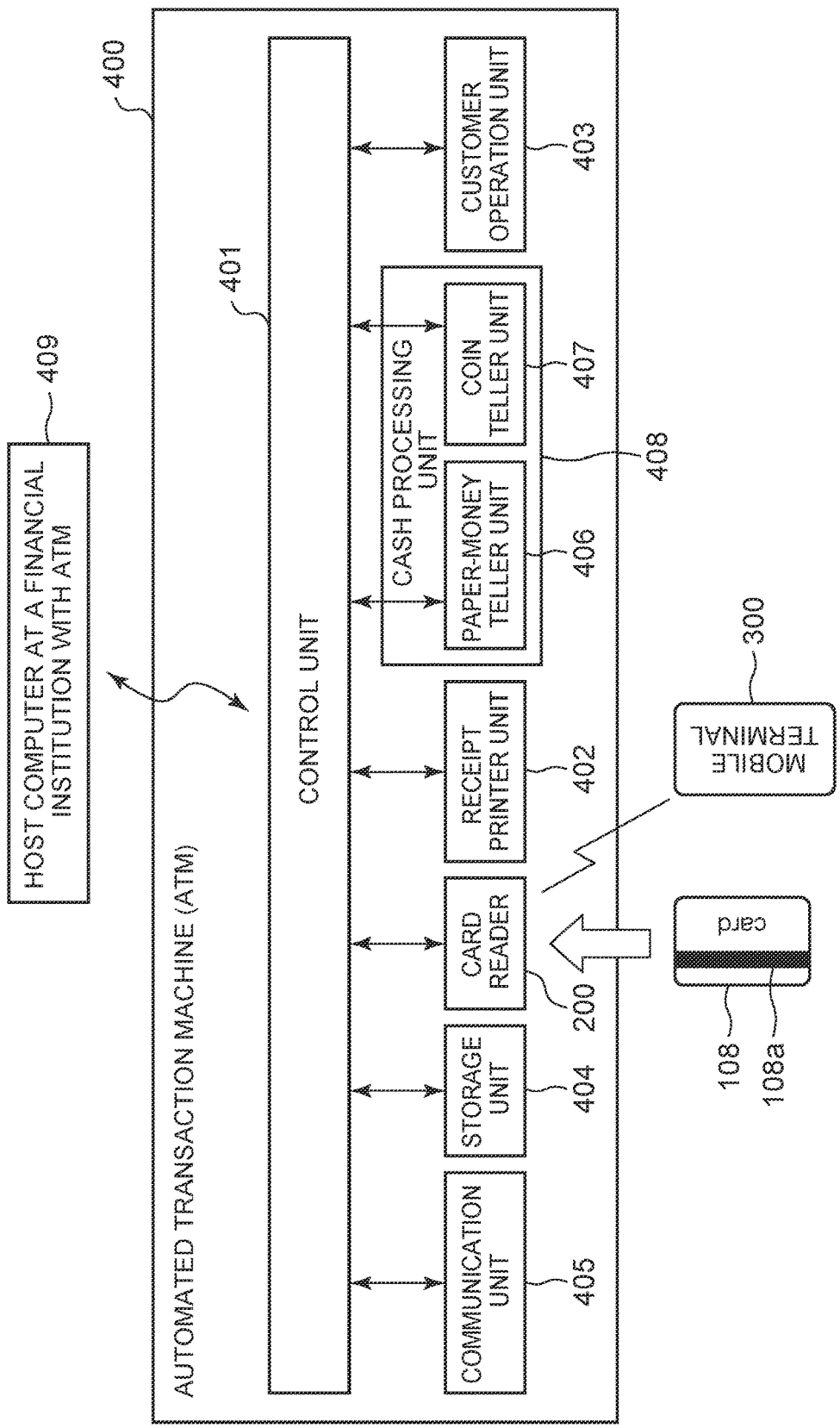
FIG. 10 is a block diagram of the configuration of an automated transaction machine in which a card reader of Embodiment 2 of the present invention is mounted.

FIG. 10 is a block diagram of the configuration of the host device in which the card reader 200 of Embodiment 2 is mounted. FIG. 11 is a block diagram of the configuration of the card reader 200 of Embodiment 2, and FIG. 12 is a block diagram of the configuration of the mobile terminal 300 of Embodiment 2.

(Automated Transaction Machine as a Host Device)

The host device used in Embodiment 2 is an automated transaction machine 400.

The automated transaction machine 400 is configured by a main control unit 401, a card reader 200 which is connected to the main control unit 401, a receipt printer unit 402, a customer operation unit 403, a storage unit 404, a communication unit 405 and a cash processing unit 408. The automated transaction machine 400 is connected to a host computer 409 at a financial institution which administers the automated transaction machine 400 via a wired or wireless communication.

The main control unit 401 controls each unit inside the automated transaction machine 400. The main control unit 401 is equipped with a CPU, a ROM, a RAM and a hard disk. The hard disk stores various kinds of programs. The ROM stores a program that administers a basic control of each unit of the automated transaction machine 400. The RAM is used as a work area of the CPU.

The communication unit 405 communicates with the card reader 200 and the host computer 409 under the control of the main control unit 401.

The cash processing unit 408 implements cash-processing such as receiving paper-money inserted at a paper-money teller unit 406, dispensing paper-money at the paper-money teller unit 406, receiving coins inserted at a coin teller unit 407 or dispensing coins at the coin teller unit 407 through the control by the main control unit 401.

The customer operation unit 403 is configured by a display and a touch panel to perform screen display through the control by the main control unit 401, and transmits to the main control unit 401 the input signals created as a customer has touched the display and input.

The receipt printer unit 402 is a device to print out the transaction content on a receipt, controlled by the main control unit 401.

(Card Reader)

The card reader 200 is mounted in the automated transaction machine 400 placed in a store or the like to read magnetic data recorded on a card 108 and/or record magnetic data on the card 108.

The control unit 201 is configured by a CPU, a ROM, a RAM and the like, to which each of the configuration components of the card reader 200 is connected, to implement the controls over the card reader functions such as a communication protocol processing, according to the software stored in the ROM. Also, the control unit 201 is provided with an authentication processing section 202 to implement authentication to judge whether the user of the card 108 is its legal owner or not. Further, various kinds of data necessary to control the card reader is stored in the memory unit 212.

When the card reader communicates with the automated transaction machine 400 and the mobile terminal 300, an encryption processing unit 203 implements encryption on the sending data and decryption on the received data under the control by the control unit 201.

The host device communication unit 204 is a communication interface for connecting the card reader with the automated transaction machine 400, which is a host device, via a USB or an RS232C for communication. By this connection, the card reader 200 is controlled by the automated transaction machine 400.

A pairing information storage unit 208 in the card reader stores the pairing information necessary for a connection setting of the short-range communication by the short-range connection unit 206. The pairing information includes an IP address which is a specific reader/writer address allocated to discriminate the card reader 200 for a short-distance communication and an authentication key shared by the mobile terminal 300. Also, the paring information storage unit 208 stores the mobile address of the mobile terminal 300 with which a pairing is already done. In this embodiment, the pairing information in the mobile terminal 300 is the last four digits of the card number which is already input and the pass key sent from the card reader 200.

The card reader 200 uses the communication unit 207 having the short-range communication unit 206 to obtain the information which is to be used to verify that the user of the card 108 such as an IC card is its legal owner.

The short-range communication unit 206 is a wireless communication interface which implements wireless communication with the short-range communication unit 303 in the mobile terminal 300, which is present within a short range, through Bluetooth communication.

The short-range communication unit 206 and the short-range communication unit 303 communicate with each other to implement the processing, when a user of the mobile terminal 300 holds up the mobile terminal 300 to the card reader 200, to verify that the user of the mobile terminal 300 is its legal owner. At that time, it is desirable that the communicable range be set to 1 m or shorter to prevent error operations of mistakenly communicating with another mobile terminal 300.

To the data reading/writing unit 210, a magnetic card, a contact IC card or a contactless IC card 108 is inserted. The card reader 200, under the control by the control unit 201, reads magnetic data recorded on a magnetic strip 108a of the inserted card 108 or IC data mounted on the card 108 such as the card number and writes specified information. With the reading and writing of the data, the card reader 200 performs transactions of money, etc.

The data reading/writing unit 210 is provided with a magnetic head for transmitting data to and from the magnetic strip 108a of the card 108 and IC contacts for transmitting data to and from the IC contacts on the card 108. The data reading/writing unit 210 transmits data to and from the magnetic strip 108a through the magnetic head or transmits data to and from the IC contacts on the card 108 through its IC contacts. Also, the contactless communication antenna provided to the card reader 200 is used for data transmission with a communication antenna provided to the card 108. Through this transmission, the data reading/writing unit 210 writes and/or reads the data with respect to the card 108 having multiple card functions such as a contactless IC card function, a contact IC card function and a magnetic card function.

The data processing unit 211 processes the data recorded on the card 108. To do this, the data processing unit 211 reads information recorded on the card 108, and further writes new information if necessary.

(Mobile Terminal)

The control unit 301 is configured by a CPU, a ROM, a RAM, etc., and connected with each configuration component of the mobile terminal 300 to implement the controls, according to the software stored in the ROM, to make the mobile terminal functions operate.

The speaker 305 and the microphone 306 are connected to the sound I/F unit 307 and used as an audio output. The sound I/F unit 307 implements the A/D conversion or D/A conversion of analogue/digital sound signals and the audio codec processing in accordance with a specified wireless band. The display unit 304 displays various information such as status information of the mobile terminal 300. The operation unit 308, configured by numeric keypad, is used when the user of the mobile terminal 300 inputs information.

The card data memory unit 309 stores card data such as the card ID which the mobile terminal 300 has received from the card 108 and the card reader information.

The authentication information input unit 310 together with the authentication information storage unit 311 configures the authentication processing unit 312; the authentication information input unit 310 is a biometric sensor, for example, to input physiological information of the user of the mobile terminal 300; thus, the authentication information input unit 310 inputs information for authentication. The physiological information is, for example, fingerprint data, veins data, etc. The authentication information storage unit 311 stores in advance the physiological information of the owner of the mobile terminal 300. When writing the card ID or/and the mobile terminal information, the authentication processing unit 312 compares the physiological information input from the authentication information input unit 310 with the physiological information stored in the authentication information storage unit 311 to verify that the user of the mobile terminal 300 is its owner. Note that, although an example of authentication by physiological information is described hereinafter, authentication may be done by using other information instead of the physiological information, such as a personal identification number. It is still desirable that physiological information be used for authentication to improve security.

The pairing information storage unit 313 in the mobile terminal stores the pairing information necessary for a connection setting of the short-range communication, in the same manner as the pairing information memory unit 208 in the card reader. The pairing information includes the authentication key. The pairing information storage unit 313 in the mobile terminal stores the card reader address of the card reader with which a pairing is already done. In this embodiment, the pairing information is the last four digits of the card number which has been input and the pass key transmitted from the card reader 200.

For communicating with the card 108 and the card reader 200 under the control by the control unit 301, the encryption processing unit 315 implements encryption on the sending data and decryption on the received data.

(Steps for Bluetooth Connection)

FIG. 13 is a transaction processing flow showing the steps for Bluetooth connection among the owner of the card 108, the mobile terminal 300 and the card reader of Embodiment 2. The steps for Bluetooth connection shown in FIG. 4 are in the processing flow in the view of the control processing; however, the steps for Bluetooth connection shown in FIG. 13 are in the processing flow in the view of a transaction processing.

When there is a request of connecting to the short-range communication unit 206 from the mobile terminal 300, the control unit 201 sends to the mobile terminal 300 part of the card number, which is read by the data reading/writing unit 210, as the connection authentication information for the short-range communication unit 206.

In other words, as shown by (1) in FIG. 13, the owner of the card 108 inputs the last 4 digits of the card number to the mobile terminal 300 and stores it in the card data memory unit 309 in advance. After that is done, as shown by (2) in the figure, the owner of the card 108 inserts the card 108 to the data reading/writing unit 210 at the card reader 200 in the automated transaction machine 400. As shown by (3) in the figure, the card reader 200 reads the card number on the inserted card 108. Next, the owner of the card 108 requests Bluetooth connection of the card reader 200 from the mobile terminal 300. Upon receiving this request, the card reader 200 processes the read card number at the authentication processing section 202 and notifies the last 4 digits of the number as the Bluetooth communication pass key to the mobile terminal 300 as shown by (5) in the figure. The mobile terminal 300 collates the last four digits of the card number, which has been input, with the pass key transmitted from the card reader 200 at the data processing unit 211 as shown by (6) in the figure, and allows Bluetooth connection when they match with each other. In this way, the mobile terminal 300 completes Bluetooth connection as shown by (7) in the figure.

As described, in order to collate part of the card data which the owner of the card 108 has input to the mobile terminal 300 (such as the last 4 digits of the card number) with the pass key transmitted from the card reader 200 to allow the connection with the short-range communication unit 206, the card reader 200 reads the card number of the card 108 inserted at the data reading/writing unit 210 and sends part of the read data to the mobile terminal 300 as the connection authentication information for the short-range communication unit 206, so that the mobile terminal 300 owned by the owner of the card 108 is specified with certainty to allow the connection to the short-range communication unit 206 while the display of the connection authentication information or new data input are not necessary.

Note that, although Bluetooth is used for the wireless communication interface between the short-range communication unit 206 and the short-range communication unit 303 in the above description, an NFC (Near Field Communication) or a wireless LAN may be used for the wireless communication interface as long as part of the card information is used for the matching between the mobile terminal 300 and the card reader 200.

(Steps of PIN Transmission)

FIG. 14 is a transaction processing flow in the PIN transmission steps among the owner of the card 108, the card reader 200 and the automated transaction machine 400 which is a host device.

The control unit 201 receives from the mobile terminal 300 a PIN (Personal Identification Number), which is a code number that the owner of the card 108 has input to the mobile terminal 300, through the short-range communication unit 303 and the short-range communication unit 206 and sends the received PIN to the automated transaction machine 400 via the host device communication unit 204.

In other words, as shown by (1) in FIG. 14, the owner of the card 108 inputs each digit of the PIN to the mobile terminal 300. Each time a digit of the PIN is input, the mobile terminal 300 stores the digit in the card data memory unit 309 and sends the digit of the PIN to the card reader 200 as shown by (2) in the figure, and immediately deletes from the card data memory unit 309 the data of the sent digit as shown by (3) in the figure. The card reader 200 stores the digits of the PIN one by one in the memory unit 212 upon receiving the data of each digit and sends the data of the digit of the PIN to the automated transaction machine 400 as shown by (4) in the figure, and immediately deletes the data of the sent digit from the memory unit 212. After this, the operations of (1) through (5) are repeated for every digit of the PIN.

As described above, the PIN which is input by the owner of the card 108 at the mobile terminal 300 is received by the card reader 200 via the short-range communication unit 206, and the PIN is sent from the card reader 200 to the automated transaction machine 400 via the host device communication unit 204; therefore, a countermeasure is used to prevent a possible criminal act such as a surreptitious photographing of the PIN input on a PINPAD installed in a fixed position.

Note that, although the PIN is input, sent and deleted from the memory one digit at a time in the above description, the PIN may be kept in the memory of the mobile terminal 300 as long as security can be maintained.

(Steps for Additional Information Transmission)

FIG. 15 is a transaction processing flow of the steps for additional information transmission among the owner of the card 108, the mobile terminal 300, the card reader 200 and the automated transaction machine 400.

When receiving a transmission request of additional information besides the card information from the automated transaction machine 400 via the host device communication unit 204, the control unit 201 receives the additional information, stored in the mobile terminal 300, as the extra information from the mobile terminal 300 via the short-range information unit 303 and the short-range information unit 206, and sends the extra information to the automated transaction machine 400 via the host device communication unit 204.

In other words, as shown by (1) in FIG. 15, the owner of the card 108 inputs the extra information such as a transfer destination bank account into the mobile terminal 300 in advance and stores it in the memory. The automated transaction machine 400, as shown by (2) in the figure, implements transactions with the card 108. Then, when the input of the extra information is needed, the automated transaction machine 400 requests the extra information of the card reader 200 as shown by (3) in the figure. Upon receiving the request, the card reader 200 requests the extra information of the mobile terminal 300 via the short-range communication unit 206 and the short-range communication unit 303, as shown by (4) in the figure. Receiving the request, the mobile terminal 300 sends the extra information stored in memory to the card reader 200 via the short-range communication unit 303, as shown by (5) in the figure. The card reader 200 sends the received extra information to the automated transaction machine 400 as shown by (6) in the figure.

As described, by enabling the card reader 200 to receive the extra information besides the card information, such as a transfer destination bank account information, which is read by the card reader 200, from the mobile terminal 300, in which the extra information has been stored in advance, via the short-range communication unit 206, it is no longer necessary for the card reader 200 to read a transfer card 108 in which the transfer destination bank account information is recorded, and also it is possible to save the time and trouble of the input operation of the transfer destination bank account information to the automated transaction machine 400 each time the owner of the card 108 transfers multiple times.

Note that, although the card reader 200 sends the extra information, which has been saved in the mobile terminal 300, to the automated transaction machine 400 responding to the request from the automated transaction machine 400 in the above description, if the extra information requested by the automated transaction machine 400 is not stored in the mobile terminal 300, the extra information may be input on the spot.

(Steps for Transaction Slip Content Transaction)

FIG. 16 is a transaction processing flow in the steps for transmitting the transaction slip contents among the owner of the card 108, the mobile terminal 300, the card reader 200 and the automated transaction machine 400.

When receiving the transaction slip contents from the automated transaction machine 400 via the host device communication unit 204, the control unit 201 sends the received transaction slip contents to the mobile terminal 300 via the short-range communication unit 206.

In other words, as shown by (1) in FIG. 16, the automated transaction machine 400 sends the transaction slip contents to the card reader 200. The card reader 200 sends the received transaction slip contents to the mobile terminal 300 via the short-range communication unit 206 and the short-range communication unit 303, as shown by (2) in the figure. The mobile terminal 300 displays the transaction slip contents on the display unit 304 so that the owner of the card 108 is prompted to confirm.

In the above manner, the transaction slip which is printed out at the receipt printer 402 in a normal automated transaction machine 400 can be sent to the mobile terminal 300 via the short-range communication unit 206 and the short-range communication unit 303 so that the wasteful printing-out of transaction slips, which is normally thrown away, can be avoided. Also, the system using the processing which is described referring to FIG. 13 through FIG. 16 is made indispensable so that a simple automated transaction machine 400 in which a PINPAD and a receipt printer 402 is removed can be realized.

(Steps for Bluetooth Connection Steps at Maintenance)

FIG. 17 is a maintenance processing flow in the steps for Bluetooth connection at maintenance among the owner of the card 108, the mobile terminal 300, the card reader 200 and the automated transaction machine 400.

The control unit 201 implements the controls of the acquisition of maintenance data needed for maintenance operation on the card reader 200 or controls the maintenance operation on the card reader 200 through wireless communication with the mobile terminal 300 via the short-range communication unit 206 and the short-range communication unit 303. Also, the control unit 201 first makes a wireless communication connection with the mobile terminal 300, then implements authentication with respect to the mobile terminal 300 at the data processing unit 211, and allows the maintenance data acquisition necessary for a maintenance operation on the card reader 200 or allows the maintenance operation on the card reader 200.

In other words, as shown by (1) in FIG. 17, a maintenance person, who is the owner of a card 108 used for maintenance, inputs the last four digits of the card number to the mobile terminal 300 and stores it in a card data memory unit 309. Then, the maintenance person inserts the card 108 into the card reading/writing unit 210 of the card reader 200 in the automated transaction machine 400, as shown by (2) in the figure. The card reader 200 reads the card number on the inserted card 108, as shown by (3) in the figure. The maintenance person requests a Bluetooth connection by the short-range communication unit 206 of the card reader 200 from the mobile terminal 300. The card reader 200 processes the read card number at the authentication processing section 202 and notifies the last four digits of the number to the mobile terminal 300 as a Bluetooth pass key, as shown by (5) in the figure. The mobile terminal 300 collates the last four digits of the card number that is already input with the pass key transmitted from the card reader 200 at the authentication processing unit 312, as shown by (6) in the figure; when both match with each other, the Bluetooth connection is allowed. By this, the mobile terminal 300 completes the Bluetooth connection, as shown by (7) in the figure. Further, the maintenance person holds the contactless IC card, which is used for maintenance, up to the mobile terminal 300 and sends the maintenance authentication data to the mobile terminal 300, as shown by (8) in the figure. The mobile terminal 300 sends the maintenance authentication data to the card reader 200 via the Bluetooth, as shown by (9) in the figure. The card reader 200 performs authentication with the transmitted authentication data for maintenance at the authentication processing section 202, and then moves to a maintenance mode, as shown by (10) in the figure.

As described, the acquisition of the maintenance data necessary for the maintenance operation or the maintenance operation is controlled through the short-range communication unit 206 which is a different wireless communication interface from the host device communication unit 204 which is the host connecting interface, so that maintenance on the card reader 200 is possible without operations having security concerns that may arise when a device panel is opened or a device operation mode is changed. Also, first a connection is made between the card reader 200 and the mobile terminal 300 via the short-range communication unit 206 and the short-range communication unit 303 and then authentication is further implemented between the mobile terminal 300 and the card reader 200 using the authentication data for maintenance to allow the control of the maintenance, enabling more certain authentication to the control of maintenance via the short-range communication unit 206, which requires high security.

Note that, although the data of a contactless IC card used for maintenance is used for authentication of a maintenance person in the above description, a PIN input to the mobile terminal 300 or a finger print authentication function installed in the mobile terminal 300 may be used to specify the maintenance person and sends the maintenance person authentication data corresponding to the maintenance person, which is held in the mobile terminal 300, to the card reader 200 for authentication.

(Steps of Maintenance)

FIG. 18 is a maintenance processing flow of the maintenance steps between the mobile terminal 300 and the card reader 200.

As shown by (1) in FIG. 18, the mobile terminal 300 receives the operation log data from the card reader 200 via the short-range communication unit 206 and the short-range communication unit 303. The mobile terminal 300 judges the necessary maintenance from the received operation log data, as shown by (2) in the figure. Then, the mobile terminal 300 instructs the card reader 200 to perform the maintenance such as taking a cleaning card inside, for example, according to the maintenance judgment.

Note that, although the mobile terminal 300 judges the necessary maintenance operations from the operation log data, the maintenance person may judge the necessary maintenance operations and instructs the card reader 200 to perform the maintenance operation by operating the operation unit 308 of the mobile terminal 300.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a system comprising a host device without a wireless communication interface, and a mobile terminal, the card reader comprising:
   a host connecting interface structured to connect with the host device of the system; and
   a wireless communication interface structured to connect with the mobile terminal;
   a control unit connected to the host connecting interface and the wireless communication interface;
   wherein said wireless user interface is structured to exchange information with said mobile terminal through said wireless communication interface and to exchange the information with said host device through said host connecting interface.

2. The card reader as set forth in claim 1, wherein
   said wireless communication interface is a Bluetooth interface;
   a control unit is provided, the control unit being structured to receive card data held in said mobile terminal via said Bluetooth interface and transmit said received card data to said host device; and
   said card reader can be mounted in various terminal devices.

3. The card reader as set forth in claim 2, wherein
   said control unit is structure to implement Bluetooth communication with said mobile terminal via said Bluetooth interface at a low transmission output before the connection is made with said mobile terminal and at a high transmission output after the connection is made with said mobile terminal.

4. The card reader as set forth in claim 2, wherein
   said control unit is structured to implement a Bluetooth connection with said mobile terminal which has read specific information assigned to it from the unique information given differently to different card readers, by said Bluetooth interface.

5. The card reader as set forth in Clam 2, wherein
   when the control unit is structured such that, in response to judging from the Bluetooth connection status between said mobile terminal, which has received card data, and said card reader that an owner of said mobile terminal is present at a position at which said host device can be operated, said control unit notifies said host device of the card insertion status.

6. The card reader as set forth in claim 5, wherein
   the control unit is structured such that in response to judging, based on the change in amount of the Bluetooth communication radio wave intensity created with said mobile terminal from the Bluetooth communication radio wave intensity which is stored immediately after the Bluetooth connection is made with said mobile terminal, that the owner of said mobile terminal has left from the position at which said host device can be operated, said control unit cancels the Bluetooth connection that is made with said mobile terminal via said Bluetooth interface and notifies said host device of the card removal status.

7. The card reader as set forth in claim 5, wherein
   the control unit is structured such that, in response to judging, based on the change in amount of the Bluetooth communication radio wave intensity created with said mobile terminal from the Bluetooth communication radio wave intensity which is stored immediately after the Bluetooth connection is made with said mobile terminal, that the owner of said mobile terminal has left from the position at which said host device can be operated and also detecting that the Bluetooth connection with said card reader is canceled, said control unit notifies said host device of the card removal status.

8. The card reader as set forth in claim 2, wherein
the control unit is structured such that, even when recognizing the Bluetooth connection with said mobile terminal and that the owner of said mobile terminal is present at the position at which a host device can be operated, said control unit disconnects the Bluetooth connection that is made with said mobile terminal via said Bluetooth interface, responding to a Bluetooth disconnect request from said host device which has judged that the owner of said mobile terminal is not present in the vicinity of said mobile terminal because there were no operations of said mobile terminal for a given time although said mobile terminal is present near said terminal device.

9. The card reader as set forth in claim 2, wherein
the control unit is structured such that, in response to a card being inserted while a Bluetooth connection is on with said mobile terminal via said Bluetooth interface, said control unit disconnects the Bluetooth connection and prioritizes processing the card data of said inserted card; when there is a Bluetooth connection request from said mobile terminal while card is inserted, rejects said Bluetooth connection request; when there is a Bluetooth connection request from another mobile terminal while a Bluetooth connection is on, rejects said Bluetooth connection request from said another mobile terminal.

10. The card reader as set forth in claim 2, wherein
said host device interface is a USB interface;
said control unit is structured to communicate card data and information of the presence of the owner of said mobile terminal with said host device through a card reader logic channel in said USB interface, and communicate the information, which is obtained through Bluetooth communication with said mobile terminal, with said host device through another logic channel in said USB interface allocated as a USB composite device.

11. The card reader as set forth in claim 1, further comprising:
a reading unit structured to read card numbers on an inserted card; and
a control unit structured to, in response to said mobile terminal requesting a connection of said wireless communication interface, sends said mobile terminal part of the card number read by said reading unit as connection authentication information for said wireless communication interface.

12. The card reader as set forth in claim 1, further comprising:
a control unit structured to a personal identification number, input by the owner of a card into said mobile terminal, from said mobile terminal via said wireless communication interface and transmit said received personal identification number to said host device via said host connecting interface.

13. The card reader as set forth in claim 1, further comprising:
a control unit structured to , in response to receiving a request of extra information besides card information from said host device via said host connecting interface, receive said extra information stored in said mobile terminal from said mobile terminal via said wireless communication interface and transmits it to said host device via said host connecting interface.

14. The card reader as set forth in claim 1, further comprising:
a control unit structured to , in response to receiving transaction slip content from said host device via said host connecting interface, transmit the received transaction slip content to said mobile terminal via said wireless communication interface.

15. The card reader as set forth in claim 1, further comprising:
a control unit structured to control acquisition of maintenance data needed for maintenance operation on said card reader or control maintenance operation on said card reader through the wireless communication made with said mobile terminal via said wireless communication interface.

16. The card reader as set forth in claim 15, wherein
said control unit is structured to, in response to making wireless communication connection with said mobile terminal via said wireless communication interface, implement authentication with said mobile terminal using said wireless communication interface and permits acquisition of maintenance data needed for maintenance on said card reader or permits maintenance operation on said card reader.

* * * * *